(12) United States Patent
Sato

(10) Patent No.: US 7,403,646 B2
(45) Date of Patent: Jul. 22, 2008

(54) IMAGE PROCESSING APPARATUS, IMAGE PROCESSING METHOD, PROGRAM, AND RECORDING MEDIUM FOR GENERATING A DIFFERENCE IMAGE FROM A FIRST RADIOGRAPHIC IMAGE AND SECOND RADIOGRAPHIC IMAGE

(75) Inventor: Makoto Sato, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 687 days.

(21) Appl. No.: 10/677,377

(22) Filed: Oct. 3, 2003

(65) Prior Publication Data

US 2004/0081342 A1  Apr. 29, 2004

(30) Foreign Application Priority Data

Oct. 24, 2002  (JP)  ............................. 2002-309841
May 13, 2003  (JP)  ............................. 2003-134022

(51) Int. Cl.
 *G06K 9/00*  (2006.01)
(52) U.S. Cl. ....................................... 382/132; 382/128
(58) Field of Classification Search ......... 382/128–132, 382/124–127, 254–275
 See application file for complete search history.

(56) References Cited

U.S. PATENT DOCUMENTS

| 5,289,374 A | * | 2/1994 | Doi et al. ..................... 600/407 |
| 5,359,513 A |   | 10/1994 | Kano et al. ............ 364/413.23 |
| 5,535,289 A | * | 7/1996 | Ito ............................. 382/130 |
| 5,598,481 A | * | 1/1997 | Nishikawa et al. ........... 382/130 |
| 5,673,332 A | * | 9/1997 | Nishikawa et al. .......... 382/128 |
| 5,982,927 A | * | 11/1999 | Koljonen ..................... 382/168 |
| 5,982,953 A | * | 11/1999 | Yanagita et al. ............. 382/294 |
| 5,987,345 A | * | 11/1999 | Engelmann et al. ......... 600/407 |
| 5,999,652 A | * | 12/1999 | Bushman ..................... 382/221 |

(Continued)

FOREIGN PATENT DOCUMENTS

CN  1259890 A2  6/2006

(Continued)

OTHER PUBLICATIONS

Chinese Office Action mailed Aug. 19, 2005 for Chinese Application No. 2003-10101899.8.

(Continued)

*Primary Examiner*—J. W.
*Assistant Examiner*—Jeffrey S Smith
(74) *Attorney, Agent, or Firm*—Fitzpatrick, Cella, Harper & Scinto

(57) ABSTRACT

In the event of displaying only increase (or disappearance) of shadows in a difference image generated based on a display mode selected by a user, a difference image is subjected to gradient conversion so that only the luminance of the region(s) where a shadow has increased (or disappeared) differs from the luminance of other regions, and the difference image thus subjected to gradient conversion is displayed, thereby displaying the states of shadow change independently. Also, negative/positive information in a past image and a current image is extracted, and further, correlation of the diagnostic judgment reference of shadows on the difference image is input. Definition of the shadow stipulates whether the parts of the affected portion improving or deteriorating are to correspond to high concentration (high luminance level) or low concentration (low luminance level) on the difference image. This facilitates observation of changes in shadows.

9 Claims, 22 Drawing Sheets

U.S. PATENT DOCUMENTS

| | | | | |
|---|---|---|---|---|
| 6,118,906 A | * | 9/2000 | Keyes et al. | 382/266 |
| 6,215,848 B1 | * | 4/2001 | Linders et al. | 378/98.12 |
| 6,240,201 B1 | * | 5/2001 | Xu et al. | 382/130 |
| 6,269,194 B1 | * | 7/2001 | Nichani | 382/270 |
| 6,343,143 B1 | * | 1/2002 | Guillemaud et al. | 382/130 |
| 6,532,307 B1 | | 3/2003 | Sato | 382/240 |
| 6,934,409 B2 | * | 8/2005 | Ohara | 382/132 |

FOREIGN PATENT DOCUMENTS

| | | |
|---|---|---|
| JP | 7-37074 | 2/1995 |
| JP | 2002-309841 A1 | 10/2002 |

OTHER PUBLICATIONS

Office Action dated Aug. 2, 2007 for Divisional U.S. Appl. No. 11/623,565.

* cited by examiner

FIG. 16A

TABLE A

|  |  | PAST IMAGE | | | | | | | |
|---|---|---|---|---|---|---|---|---|---|
|  |  | NEGATIVE | | | | POSITIVE | | | |
|  |  | LUT1 | LUT2 | LUT3 | LUT4 | LUT1 | LUT2 | LUT3 | LUT4 |
| CURRENT IMAGE | NEGATIVE | I | I | I | III | II | I | I | III |
|  | POSITIVE | I | II | I | III | I | I | III | I |

FIG. 16B

TABLE B

|  |  | PAST IMAGE | | | | | | | |
|---|---|---|---|---|---|---|---|---|---|
|  |  | NEGATIVE | | | | POSITIVE | | | |
|  |  | LUT1 | LUT2 | LUT3 | LUT4 | LUT1 | LUT2 | LUT3 | LUT4 |
| CURRENT IMAGE | NEGATIVE | I | I | III | I | I | II | I | III |
|  | POSITIVE | II | I | I | III | I | I | I | III |

FIG. 17
| TYPE | CHANGE IN SHADOW | BRIGHTNESS OF SHADOW |
|---|---|---|
| A | INCREASE | LOW CONCENTRATION |
| B | INCREASE | HIGH CONCENTRATION |
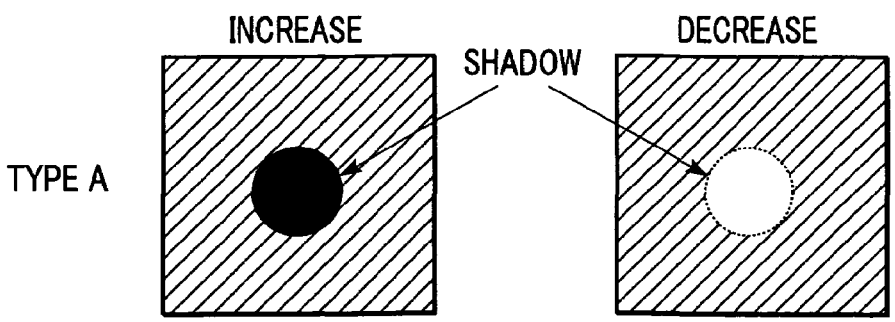
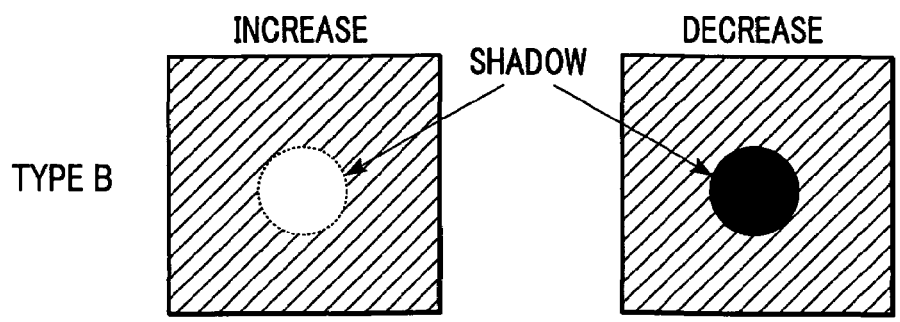

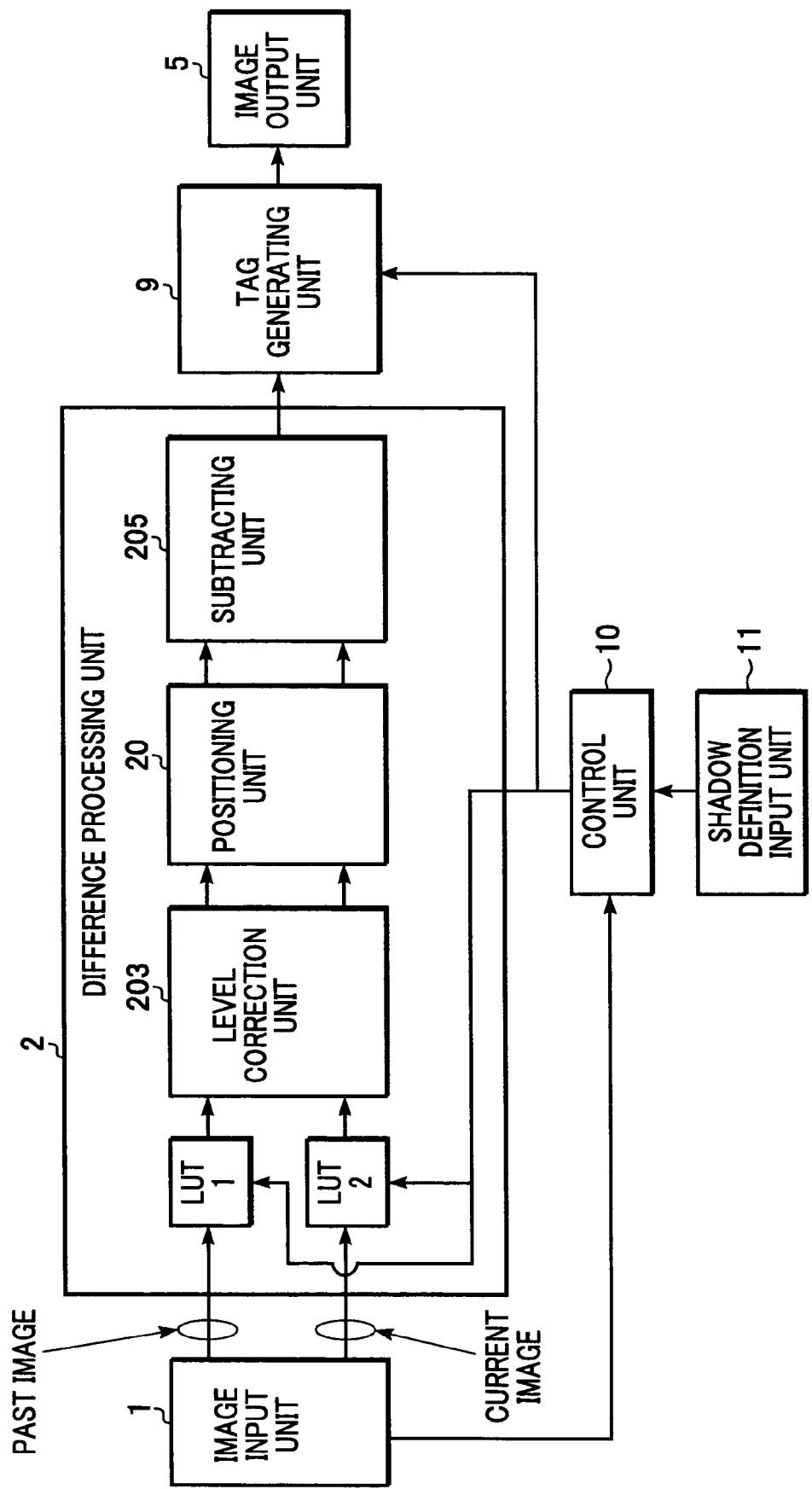

SIGNALS OF PAST IMAGE

SIGNALS OF CURRENT IMAGE

SIGNALS OF DIFFERENCE IMAGE

DIFFERENCE IMAGE

IMAGE PROCESSING APPARATUS, IMAGE PROCESSING METHOD, PROGRAM, AND RECORDING MEDIUM FOR GENERATING A DIFFERENCE IMAGE FROM A FIRST RADIOGRAPHIC IMAGE AND SECOND RADIOGRAPHIC IMAGE

BACKGROUND OF THE INVENTION

1. Field of the Invention

The present invention relates to an image processing method, and particularly refers to an image processing method suitably used for displaying change of a subject over time in medical images.

2. Description of the Related Art

As of recent, JIRA (Japan Industries Association of Radiological Systems) has set the MIPS (Medical Image Processing Systems) standards in accordance with DICOM (Digital Information and Communication in Medicine) which is an international standard regarding digitizing medical images, and accordingly, digitizing of medical images is making progress.

In the medical image field, there is increased use of CAD (Computer Aided Diagnosis) for analyzing medical X-ray images, CT scan images, MRI images, and so forth, using computers. Especially noteworthy is time-difference CAD which yields the difference over time of images taken of the same portion.

With CAD which handles the difference over time, image analysis is performed for a pair of plain orbital radiography images of the chest taken at different points in time, for example. Portions in the images which are anatomically the same are found, either the current or the past image is deformed, and difference processing is performed on each pixel.

The luminance value of the difference image obtained by such difference processing corresponds to the change in image signals in the current and past images. That is, in the event that there is no difference between the past image and current image, the difference value is 0, but in the event that there is some sort of change, there is a change in the luminance level corresponding to the change thereof.

FIGS. 22A through 22D illustrate an example of change in images signals for images taken of the same portion at different points in time. Signals of the past image and signals of the current image, and signals of the difference image obtained from these, are shown one-dimensionally.

FIG. 22A shows past image signals with a generally smooth profile. On the other hand, the region A in FIG. 22B which is a current image shows signals indicating a shadow which has appeared since. Subtracting the signals of the current image from the past image and generating difference image signals of the difference yields the profile shown in FIG. 22C.

FIG. 22D is an example of a difference image of a chest X-ray image wherein such a change has occurred, with the region A having a low luminance corresponding to the newly-appeared shadow being shown. Displaying a difference image in this way allows changes which have occurred between the two images to be observed more readily, which is advantageous, since change over time can be more readily observed from the two images.

However, it would be entirely mistaken to assume that shadows only increase or disappear from one image to another, and there are cases wherein one shadow will have increased while another has disappeared. That is to say, both appearance (or growth) and disappearance (or shrinking) of shadows may be consecutively ongoing processes, so with the above-described technique, there is the problem that the interpreter of the radiograms, i.e., the physician, must carefully observe any change in any of the images displayed in the difference image.

Also, there is the problem that in the event that there is a great number of shadows displayed in the difference image, change in the shadows is more readily overlooked, and moreover, with a great number of shadows, judging the overall progress becomes difficult.

With radiograms, there are cases wherein whether high pixel values are displayed corresponding to high luminance or corresponding to low luminance, depending on the image generating apparatus. For example, with apparatuses wherein digital images are generated by directly or indirectly converting X-rays which have passed through the subject into electric signals, as with FPDs (Flat Panel Detectors) which have come into practical use in recent years, image data is generated as a positive image wherein the pixel values of regions with high X-ray transmissivity such as in the lung field are high, and the high pixel values are displayed corresponding to high luminance on the display. Thus, the values of the corresponding pixels in the lung field are great for chest X-rays, for example. On the other hand, normal radiograms are observed as negative images, so with image data wherein the X-ray film is digitized using a film scanner or the like, the values of the corresponding pixels in the lung field are small. Accordingly, performing difference processing with both negatives and positives together means that the way the shadow is displayed is not always the same, and judgment becomes extremely difficult.

SUMMARY OF THE INVENTION

The present invention has been made in light of the above-described problems, and accordingly, it is an object thereof to perform difference image display such that observation of change in individual shadows can be made in an easy and sure manner even in the event that changes in shadows are occurring at multiple locations, and also to allow judgment of observation of the process to be made in an easy and sure manner.

It is another object of the present invention to provide a method and apparatus for generating consistent difference images even when generating difference images from negative and positive images intermingled, and particularly to provide a method and apparatus capable of outputting difference images with consistency in the display format of shadows on the difference image.

The foregoing objects are attained by providing an image processing method for generating a difference image from a first radiographic image and a second radiographic image, the method comprising: a decision step, of deciding which one of a shadow increase region or a shadow decrease region of the difference image of the first radiographic image and the second radiographic image is to be displayed as a high-concentration region or a low-concentration region; an image processing step, of changing the first radiographic image and/or the second radiographic image into a negative image or a positive image based on the decision of the decision step; and a computing step, of computing a difference image from the first radiographic image and the second radiographic image changed in the image processing step.

Further objects, features and advantages of the present invention will become apparent from the following description of the preferred embodiments with reference to the attached drawings.

BRIEF DESCRIPTION OF THE DRAWINGS

The accompanying drawings, which are incorporated in and constitute a part of the specification, illustrate embodiments of the invention and, together with the descriptions, serve to explain the principle of the invention.

FIGS. 16A and 16B are diagrams for use in describing a combination of look-up tables.

FIG. 17 is a diagram for use in describing shadow definitions in difference images.

FIG. 21 is a block diagram illustrating the functional configuration of a modification of the fifth embodiment of the present invention.

DESCRIPTION OF THE PREFERRED EMBODIMENTS

The preferred embodiments of the present invention will be described in detail in accordance with the accompanying drawings.

First Embodiment

Figure 1:
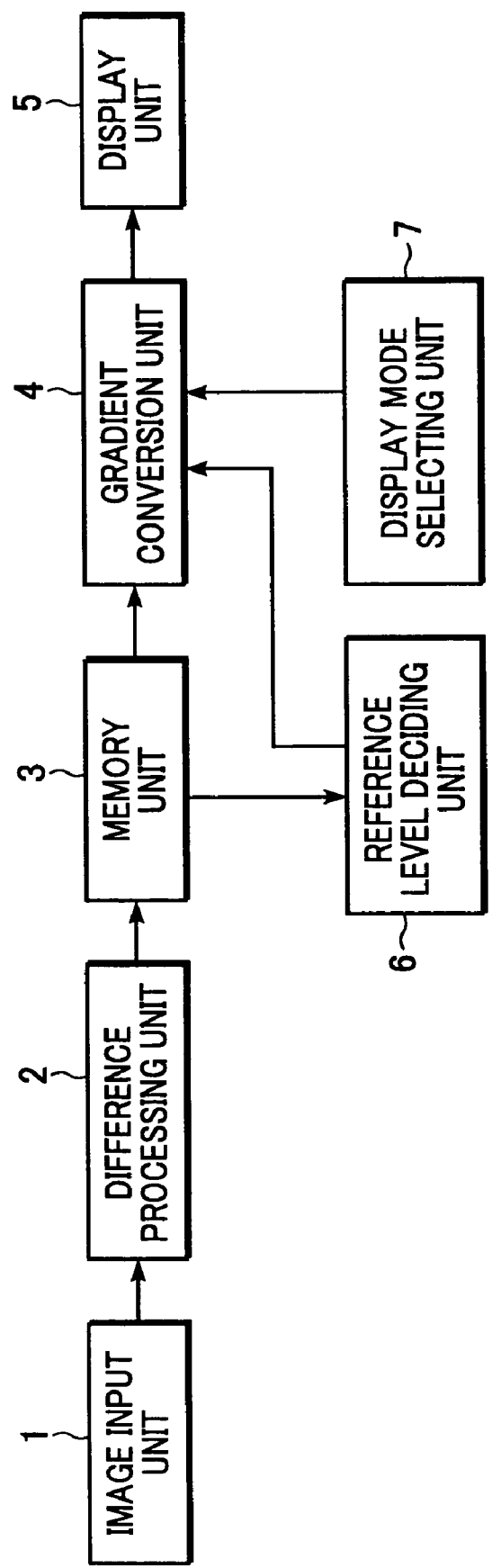
FIG. 1 is a diagram illustrating a basic configuration of an image processing device according to a first embodiment of the present invention.

A first embodiment of the present invention will now be described with reference to the drawings. FIG. 1 is a diagram illustrating a basic configuration of an image processing device to which the first embodiment of the present invention will be applied.

To begin with, the overall operations will be described. At least two images input to an image input unit 1 are subjected to processing at a difference processing unit 2, and a difference image is generated. The difference image is temporarily stored in a memory unit 3, subjected to necessary processing at a gradient conversion unit 4, and output for display on a display unit 5. The display unit 5 is a display device such as a high-resolution CRT monitor or liquid crystal monitor or the like, where the physician performs the diagnosis.

Also, in the following description, the pair of images serving as the basis for the difference processing are also stored in the memory unit 3 in the same way and output for display on the display unit 5 as appropriate, to be used for diagnosis along with the difference image.

Figure 2:
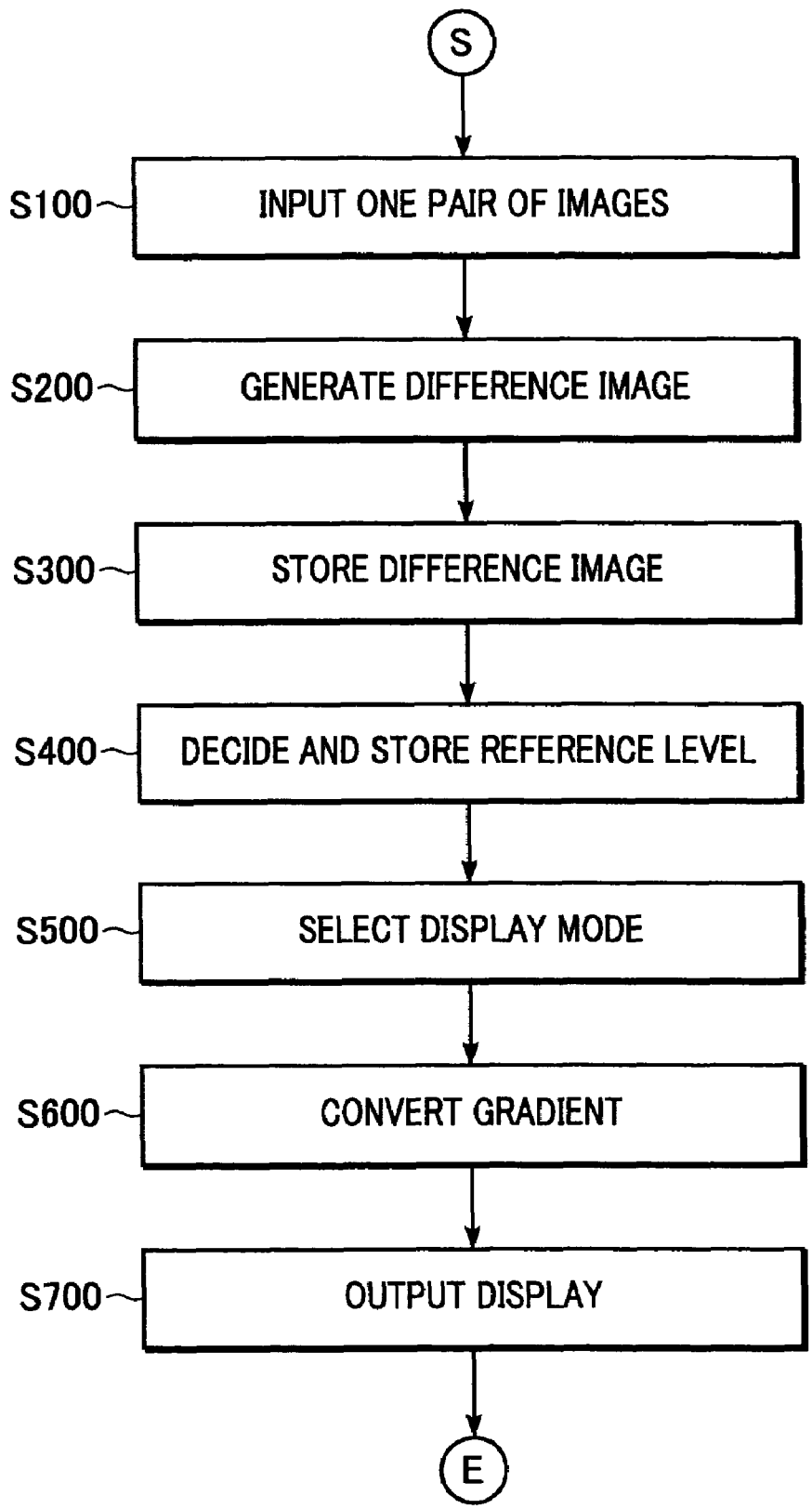
FIG. 2 is a flowchart illustrating an example of detailed actions of the members of the image processing device according to the first embodiment of the present invention, i.e., the image processing method.

Next, an example of the detailed operations of the members of the image processing apparatus according to the present embodiment, i.e., the image processing method, will be described based on the flowchart shown in FIG. 2.

[Step S100]

First, in step S100, a pair of images are output from the image input unit 1. In FIG. 1, the image input unit 1 is a device for inputting multiple images taken by an unshown image-taking device, and the pair of images to be supplied for difference processing are input from an external storage device such as a hard disk, for example.

Now, while the present embodiment assumes that the pair of images to be subjected to difference processing are taken by a predetermined image-taking device at different points in time and stored beforehand, the present invention is not restricted to this arrangement. For example, an arrangement may be made wherein one of the images has already been taken and stored in an external storage device, but the other image is input through the image input unit 1 as soon as it is taken. Further, the image input unit 1 may be an interface device which inputs images stored in an external storage device connected via a network.

[Steps S200 and S300]

The pair of images input in step S100 are subjected to positioning and difference processing at the difference processing unit 2. This generates the difference image, which is stored in the memory unit 3. Regarding the details of the positioning and difference processing of the pair of images may be performed with a known technique, for example, the technique disclosed in Japanese Patent Laid-Open No. 7-37074, there entire disclosure of which is incorporated herein by reference.

Specifically, the images are positioned by non-linearly distorting one of the pair of digitized images, and performing subtraction between the one distorted image and the other undistorted image, thereby generating the difference image.

With the present embodiment, the values indicating the change in shadow that has been generated are as such that the negative value corresponds to a case wherein the shadow has increased, and the positive value corresponds to a case wherein the shadow has disappeared. However, this relation is not indispensable for the present invention, and the opposite may be used.

[Step S400]

A reference level deciding unit 6 analyzes the difference image stored in the memory 3, decides a reference level for the difference image, and stores this in (unshown) internal memory. The reference level is a value corresponding to the luminance of a pixel in a portion where there has been no change between the two images, and is normally 0 in difference images.

However, in the event that there is a margin or an error in the positioning, or the image-taking conditions for the two images are not the same, such that there is a difference in the average luminance of the pair of images, the reference level may not be 0. Accordingly, with the present embodiment, the reference level is determined based on a histogram of the difference image.

Figure 3:
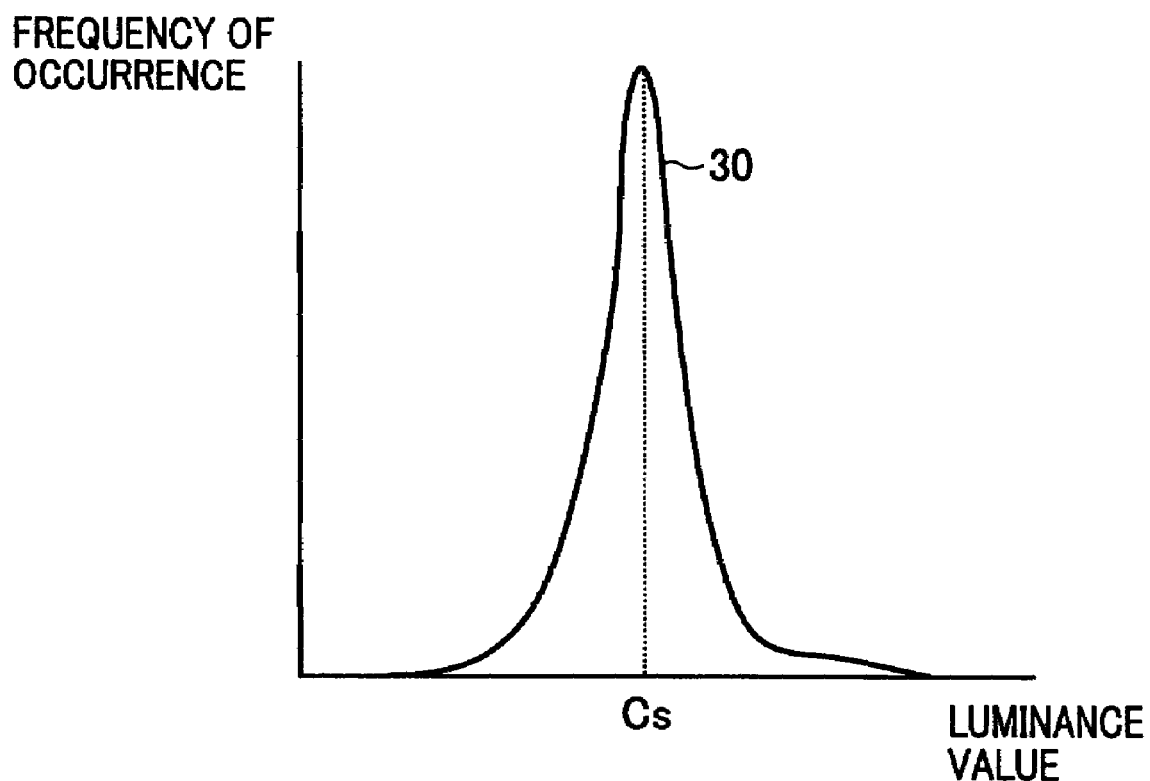
FIG. 3 is a diagram illustrating a histogram of a difference image according to the first embodiment of the present invention.

FIG. 3 is a diagram illustrating an example of a histogram of a difference image. In time-difference processing, positioning is performed between two images, so the frequency of occurrence of a luminance level is the highest corresponding to portions with no change. Accordingly, the reference level deciding unit 6 obtains the luminance value Cs which has the highest frequency of occurrence in the histogram 30, and stores this luminance value Cs as the reference level Cs.

[Step S500]

A display mode selecting unit 7 allows the user to select by inputting what sort of shadow change is to be displayed at the time of displaying the difference image. While three types of shadow change, i.e., no change, increase in shadow, and disappearance of shadow, can be conceived, the user can select one of the following three display modes from the display mode selecting unit 7. (As used herein, "disappearance" includes a lessening of a shadow, as well as the complete elimination of a shadow.)

(1) Display all shadow changes
(2) Display only increases in shadows
(3) Display only disappearances of shadows A user interface is used for selection of the display mode, so that the user can exclusively select one of the three modes on a screen capable of interactive input.

Figure 4:
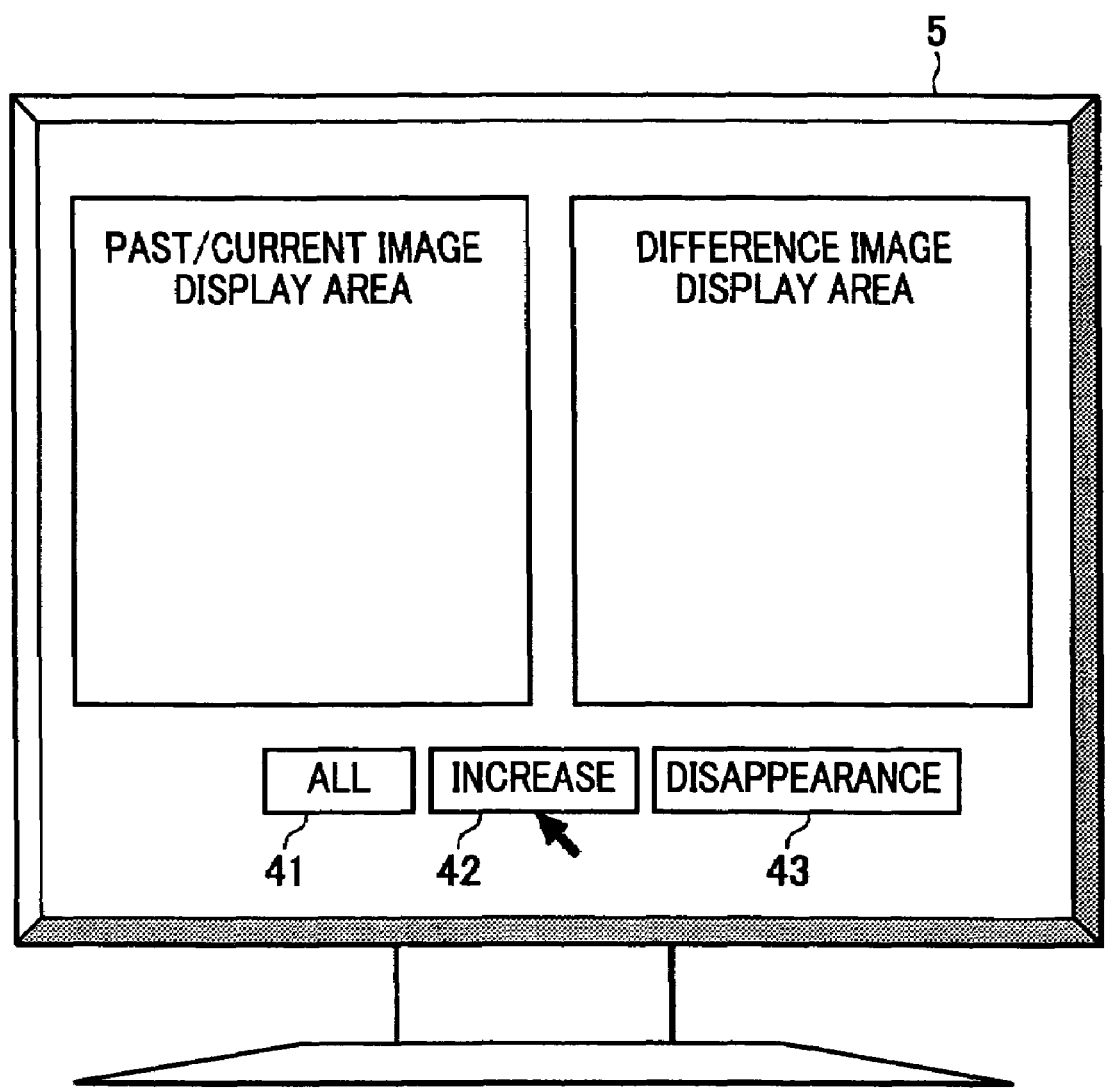
FIG. 4 is a diagram illustrating an example of a monitor display made on a display unit with the first embodiment of the present invention.

FIG. 4 is a diagram illustrating an example of a monitor screen displayed on the display unit 5 upon the user making a selection from the display mode selecting unit 7. In this example, the difference image is displayed on a monitor equivalent to the display unit 5, and the display mode can be selected on the same screen where the difference image is displayed. Or, the display mode may be selected on a separate monitor from that where the difference image is, with switches or the like provided separately from the screen shown in FIG. 4.

With the example shown in FIG. 4, three buttons denoted by reference numerals 41 through 43 are displayed on the screen, and only one of these can be selected. Thus, whether to display all shadows, or to display only one of the increasing or only the disappeared shadows, is selected, and the results of this selection are output to the gradient conversion unit 4. The arrow shown in the screen in FIG. 4 is the mouse cursor.

[Step S600]

The gradient conversion unit 4 converts the difference image stored in the memory unit 3 based on the display mode input from the display mode selecting unit 7, and outputs the converted image to the display unit 5. The following is a description of each of the conversion methods corresponding to the display modes.

Figure 5A:
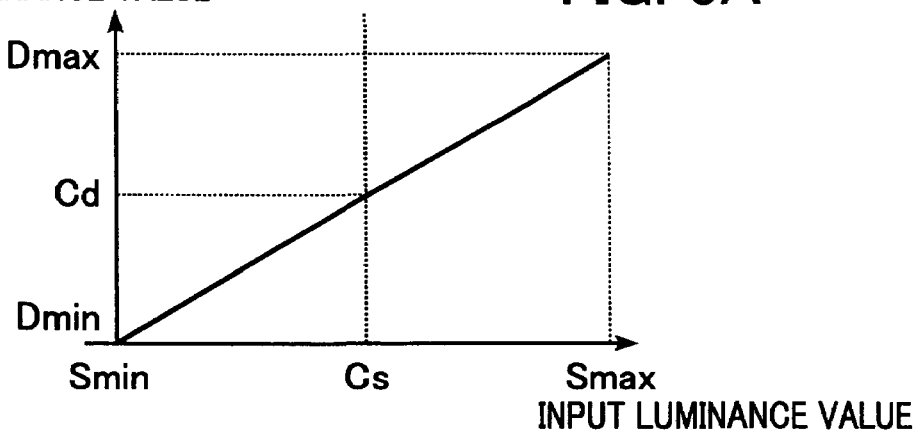
FIGS. 5A through 5C are diagrams illustrating examples of gradient conversion properties for each mode according to the first embodiment of the present invention.
Figure 5B:
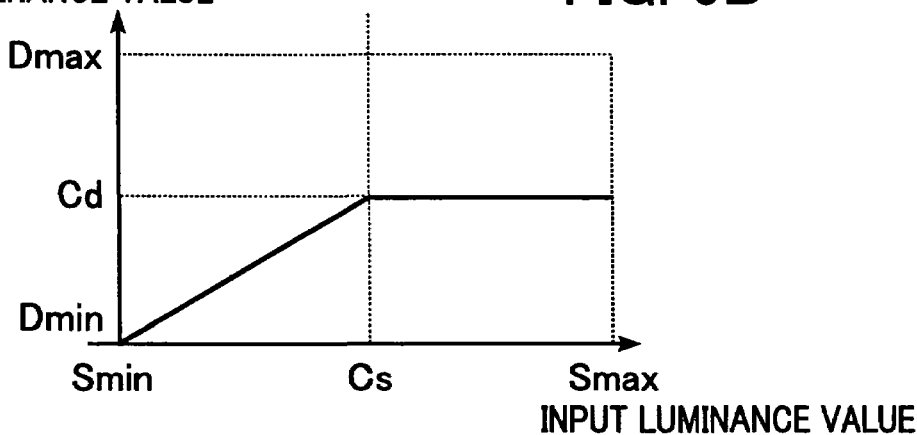
Figure 5C:
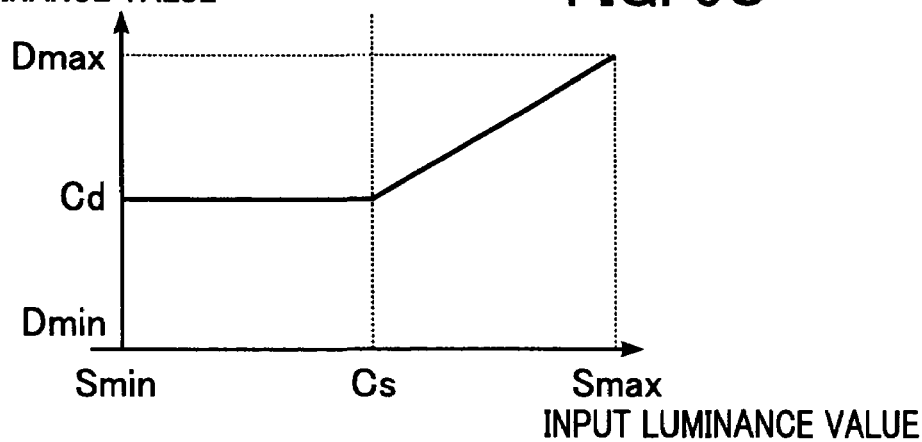

FIGS. 5A through 5C illustrate an example of the relation between the input luminance and the output luminance, i.e., the gradient conversion properties, for each of the display modes.

In the event that the mode is the mode for displaying all shadow changes, the gradient conversion unit 4 converts the difference image based on the relation shown in FIG. 5A, and outputs the converted image. In the event that the mode is the mode for displaying only increases in the shadows, the gradient conversion unit 4 converts the difference image based on the relation shown in FIG. 5B, and outputs the converted image. In the event that the mode is the mode for displaying only disappearances in the shadows, the gradient conversion unit 4 converts the difference image based on the relation shown in FIG. 5C, and outputs the converted image.

In the drawings, Smin and Smax indicate the minimum and maximum values in the input, i.e., in the difference image. In the same say, Dmin and Dmax indicate the minimum and maximum values in the output, i.e., the output image to be displayed. Cd represents the intermediate value of the luminance level in the output image, and this corresponds to the reference level Cs in the difference image as described above.

Accordingly, upon the gradient conversion being performed, in the event that the mode is for displaying all shadow changes, the difference image is simply linearly mapped within the luminance range of the output image. In the event that the mode is for displaying only increases in the shadows, all luminance levels greater than the reference level Cs are mapped to the intermediate value Cd. In the event that the mode is for displaying only disappearances in the shadows, all luminance levels smaller than the reference level Cs are mapped to the intermediate value Cd.

Now, the intermediate value Cd corresponds to the luminance level of portions wherein there was no change in the original difference image, so only the changes in shadows where there are increases are observed with the mode for displaying increases, and only the changes in shadows where there are disappearances are observed with the mode for displaying disappearances.

[Step S700]

The display unit 5 inputs and displays the difference image subjected to gradient conversion at the gradient conversion unit 4 as described above. As for the display format, one or the other of the past and current images, and the difference image subjected to gradient conversion may be displayed side-by-side as shown in FIG. 4 for example, or all three of these images may be displayed side-by-side. Note that the display format is not restricted to either of these examples, and that various formats can be used.

Figure 6A:
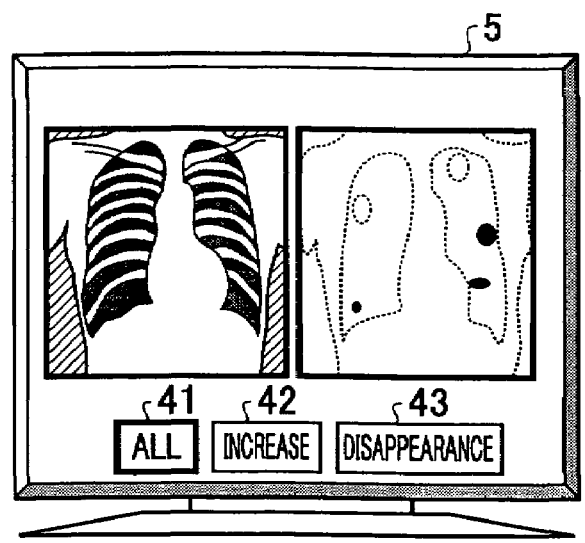
FIGS. 6A through 6C are diagrams illustrating examples of actual images displayed on the display unit with the first embodiment of the present invention.
Figure 6B:
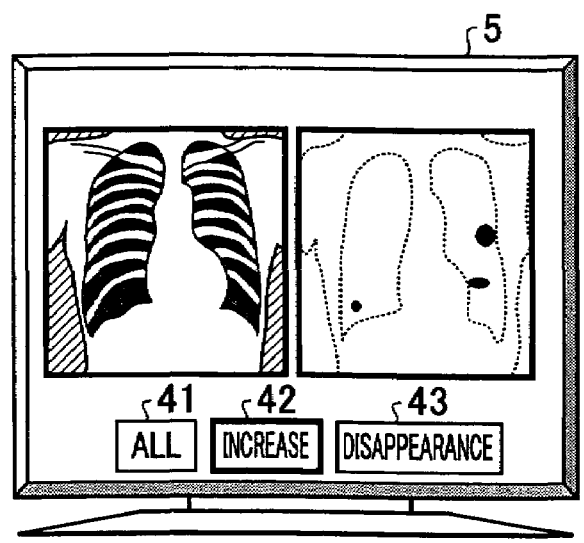
Figure 6C:
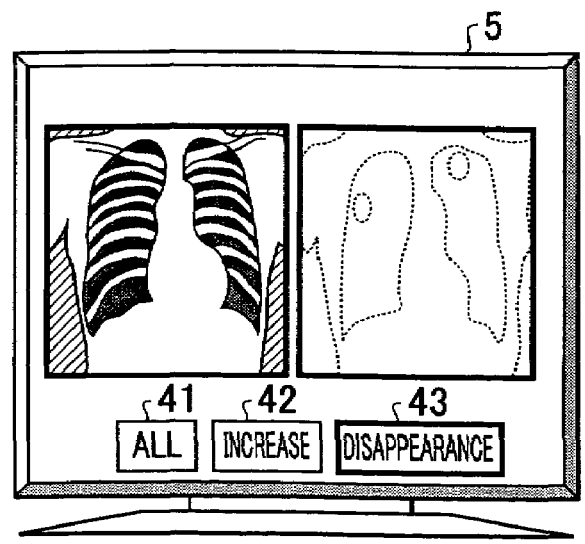

FIGS. 6A through 6C are diagrams illustrating examples of actual images displayed on the display unit 5, FIGS. 6A, 6B, and 6C corresponding to the mode for displaying all shadow changes, the mode for displaying only increases in the shadows, and the mode for displaying only disappearances in the shadows, respectively. Performing gradient conversion as described above allows the changes in shadows to be individually displayed and observed as shown in FIGS. 6A through 6C.

Thus, with the present embodiment, in the event of displaying only increases (disappearances) in the shadows, the difference image is processed and displayed such that the luminance of the regions wherein the shadows have disappeared (increased) is mapped to the intermediate value Cd corresponding to the reference level Cs, so only the regions wherein the shadows have increased (disappeared) are distinguished from other regions. Accordingly, even in the event that regions with increases in the shadows and regions with disappearances in the shadows exist together, with a great number of changes in shadows, each state of increase or disappearance can be separately displayed as an image. Accordingly, changes in the shadows can be readily observed, facilitating judgment in following developments of lesions and so forth. As a result, the physician who interprets the image can easily and accurately interpret the image without missing increases or disappearances in shadows, and further can easily and accurately grasp the overall change in the difference image.

Now, with the present embodiment, in the event of displaying only increases (disappearances) in the shadows, the luminance of the regions wherein the shadows have disappeared (increased) is mapped to the intermediate value Cd corresponding to the reference level Cs, and converted to the luminance of the state where there is no change in the shadows, but there is no need always to convert disappearances (increases) in the shadows to the luminance of the state where there is no change in the shadows, as long as only the regions wherein the shadows have disappeared (increased) are distinguished from other regions. For example, the contrast of the disappearances (increases) in the shadows may be relatively reduced.

Second Embodiment

Next, the second embodiment of the present invention will be described. With the present embodiment, the extent of increase and/or disappearance of shadows is displayed by analyzing portions where there is change in shadows, following the gradient conversion described in the first embodiment. Thus, with the present embodiment, only the processing following gradient conversion differs from that of the first embodiment, so portions which are the same as the first embodiment will be denoted with the same reference numerals as those in FIGS. 1 through 6C, and detailed description thereof will be omitted.

Figure 7:
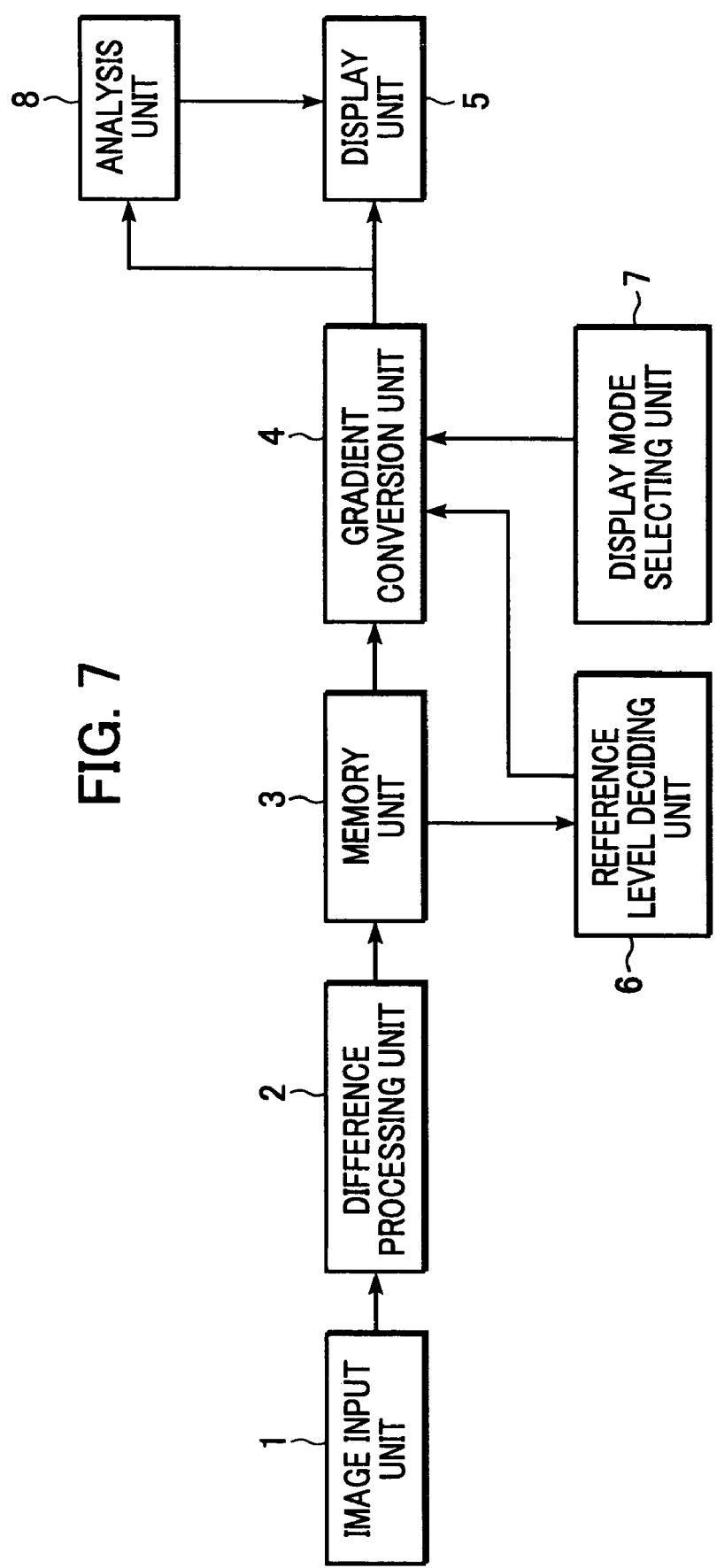
FIG. 7 is a diagram illustrating a basic configuration of an image processing device according to a second embodiment of the present invention.

FIG. 7 illustrates an example of a basic configuration of an image processing apparatus to which the present embodiment is applied. In the drawing, the image processing apparatus is the same as that according to the first embodiment shown in FIG. 1 other than an analysis unit 8 being added. The output image generated by the gradient conversion unit 4 is input to the display unit 5 and to the analysis unit 8.

Figure 8:
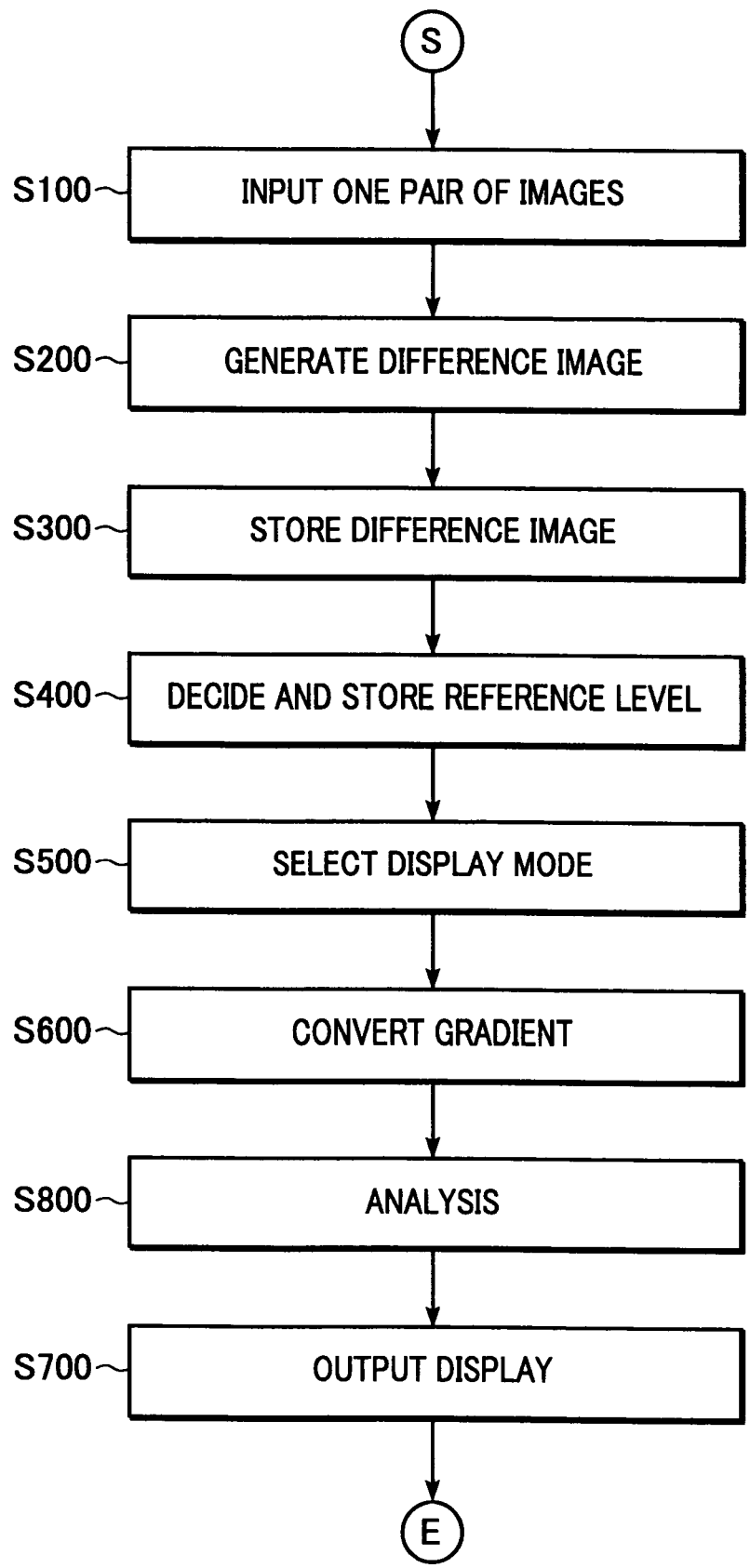
FIG. 8 is a flowchart illustrating an example of detailed actions of the members of the image processing device according to the second embodiment of the present invention, i.e., the image processing method.

An example of the detailed actions of the members of the image processing device according to the present embodiment, i.e., the image processing method, will be described based on the flowchart shown in FIG. 8. However, all of the steps in FIG. 8 are the same as those in the first embodiment (shown in FIG. 2) except for step S800, so description of all steps other than step S800 will be omitted here.

[Step S800]

The difference image subjected to gradient conversion at the gradient conversion unit 4, i.e., the output image, is binarized by the analysis unit 8, where analysis is performed separately for the mode for displaying only increases in the shadows and the mode for displaying only disappearances in the shadows. More specifically, characteristics such as the number of regions representing change, area, and so forth, are calculated separately for each display mode.

Figure 9:
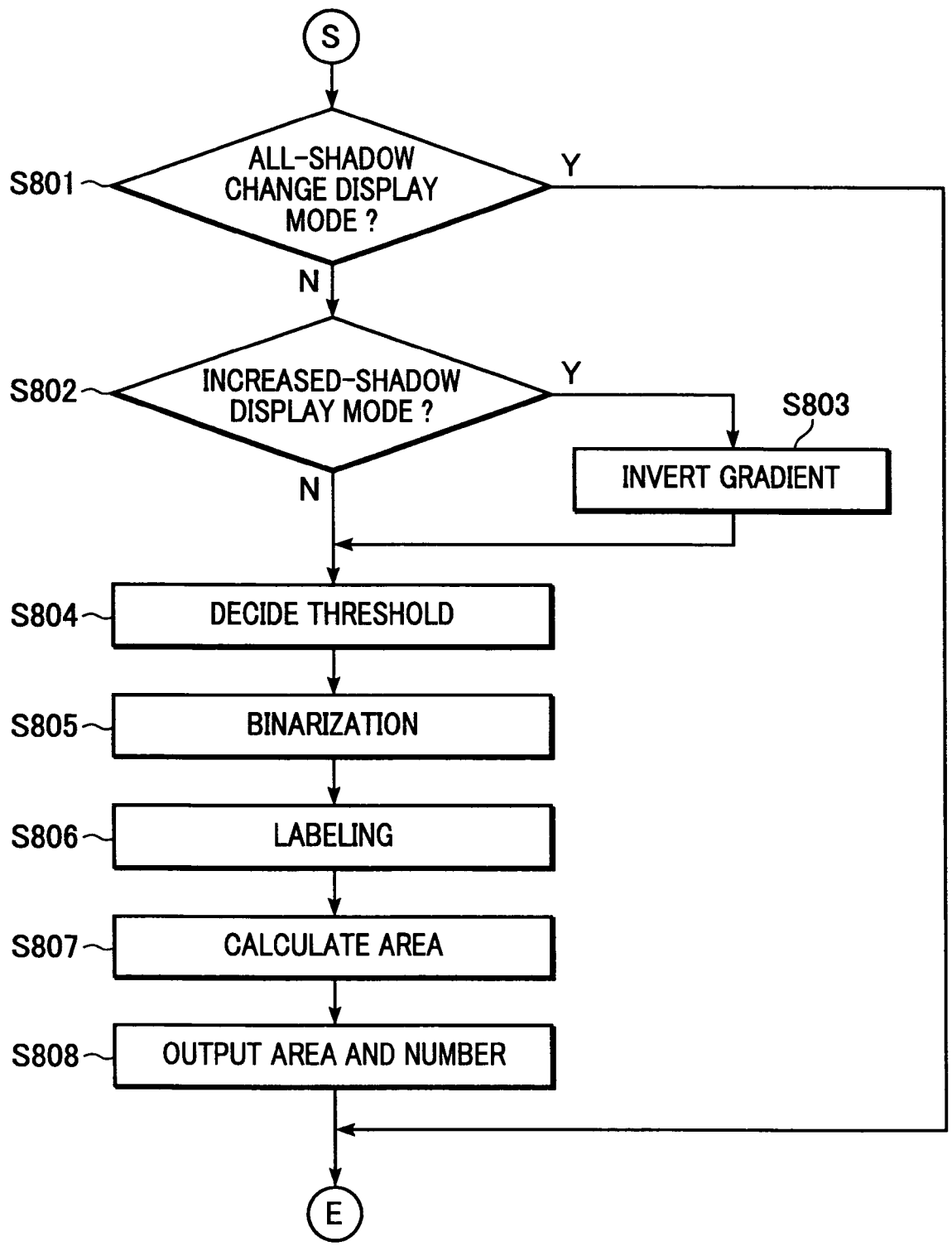
FIG. 9 is a flowchart illustrating even more detailed actions of an analysis unit according to the second embodiment of the present invention.

Next, the detailed operations of the analysis unit 8 will be described with reference to the flowchart shown in FIG. 9.

[Step S801]

The analysis unit 8 inputs the current display mode from the display mode selecting unit 7, and in the event that the display mode is the mode for displaying all shadow changes, the processing ends. In this case, the output from the analysis unit 8 is invalid, but the fact that the output from the analysis unit 8 is invalid can be recognized by the following display unit 5 by appropriating a special value. Or, an arrangement may be made wherein the display unit 5 recognizes the display mode, and in the event that the display unit 5 recognizes the display mode to be the mode for displaying all shadow changes, the input from the analysis unit 8 is invalidated (ignored).

[Steps S802 and S803]

Further, in the event that the current mode is the mode for displaying only increases in the shadows, the gradient of the difference image following gradient conversion is inverted, and the flow proceeds to the next step. Thus, the portions where change in shadows has occurred in the later-described binarization processing can be uniformly assigned white pixels.

[Step S804]

The analysis unit 8 sets a threshold value for binarization regarding the post-gradient-conversion difference image that has been input. Known techniques can be used for setting the threshold, such as the P-tile method. The settings for area ratio in the P-tile method should be set beforehand, according to sensitivity to change in shadows.

[Step S805]

The analysis unit 8 binarizes the post-gradient-conversion difference image and generates a binary image, based on the threshold value set in step S804. Accordingly, a binary image can be obtained wherein portions having change in the shadows (increase or disappearance) are assigned 1 (white), and other portions are assigned 0 (black).

[Step S806]

The binary image generated in step S805 is subjected to labeling, so as to perform region separation of independent shadow changes, and the number of the separated regions is counted.

[Step S807]

The areas of each the regions separated by the labeling performed in step S806 are calculated, and the sum thereof is calculated.

[Step S808]

The number of regions obtained in steps S806 and S807, and the sum of the area of each, are output.

Figure 10:
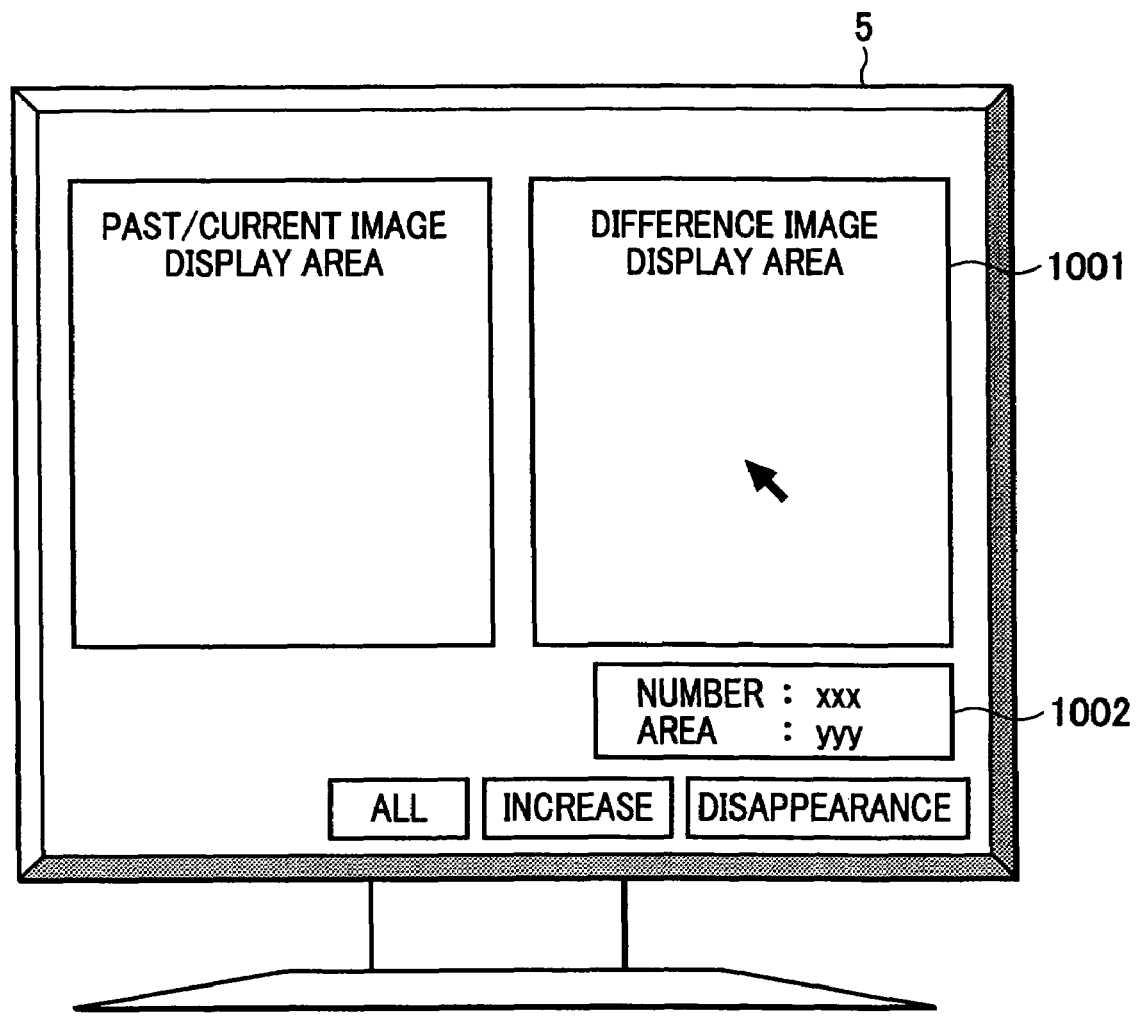
FIG. 10 is a diagram illustrating an example of a monitor display made on a display unit with the second embodiment of the present invention.

FIG. 10 is a diagram illustrating an example of a monitor screen displayed on the display unit 5 according to the processing described above according to the present embodiment.

In this example, the number and area of regions with change in the shadows in the selected display mode are displayed within a display area 1002 below a difference image display area (an area wherein the difference image subjected to gradient conversion is displayed) 1001. Thus, how much change is occurring at each shadow change region can be quantitatively understood.

As described above, with the present embodiment, the number and area of regions with change in shadows are calculated and displayed, so in addition to the advantages of the first embodiment, the interpreter can quantitatively understand the state of change, and can grasp the change in the overall difference image in an easy and sure manner.

While the above description has the area of each of the regions divided by the labeling to be totaled and displayed, the area for each region may be calculated and separately listed in the display area 1002.

Third Embodiment

Next, the third embodiment of the present invention will be described. With the present embodiment, only the gradient conversion processing differs from that of the first and second embodiments, so portions which are the same as the first embodiment will be denoted with the same reference numerals as those in FIGS. 1 through 10, and detailed description thereof will be omitted.

While gradient conversion was made with the gradient conversion unit 4 in the first embodiment such that the relation of output luminance values as to the input luminance values (see FIG. 5) is linear, the gradient conversion does not need to be limited to this method. An example of gradient conversion properties according to the present embodiment is illustrated in FIGS. 11A and 11B.

Figure 11A:
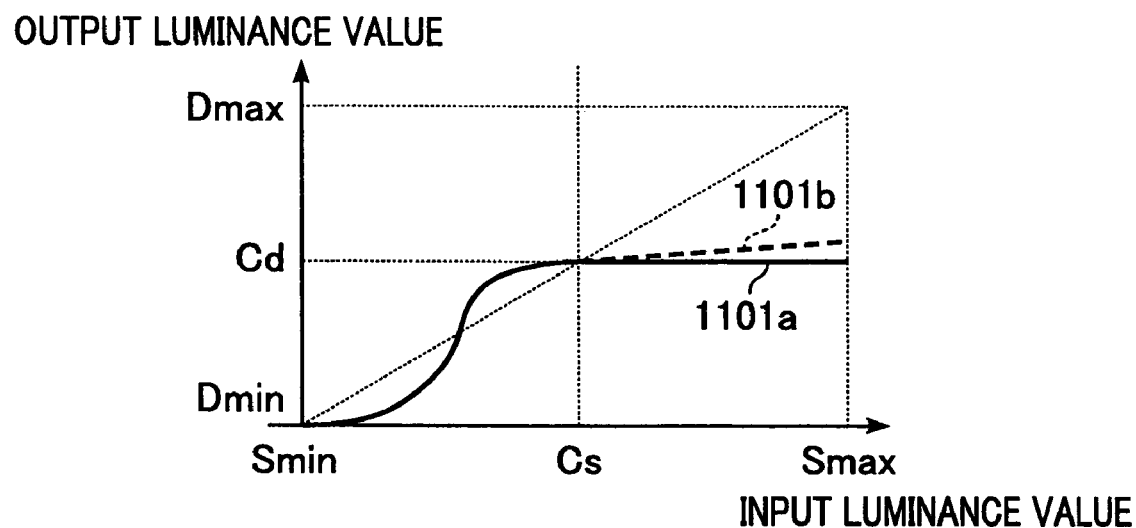
FIGS. 11A and 11B are diagram illustrating an example of gradient conversion properties for each mode according to a third embodiment of the present invention.

FIG. 11A illustrates the properties in the case that the display mode is for displaying only increases in the shadows. As indicated by the property 1101*a*, the gradient of input at the reference level Cs or lower is non-linearly converted, while the gradient of input exceeding the reference level Cs is converted to the intermediate value Cd. Thus, output is suppressed for regions with little value change in shadows, so noise due to shifting of position and so forth can be suppressed. This allows the change in shadows to be viewed more readily.

Figure 11B:
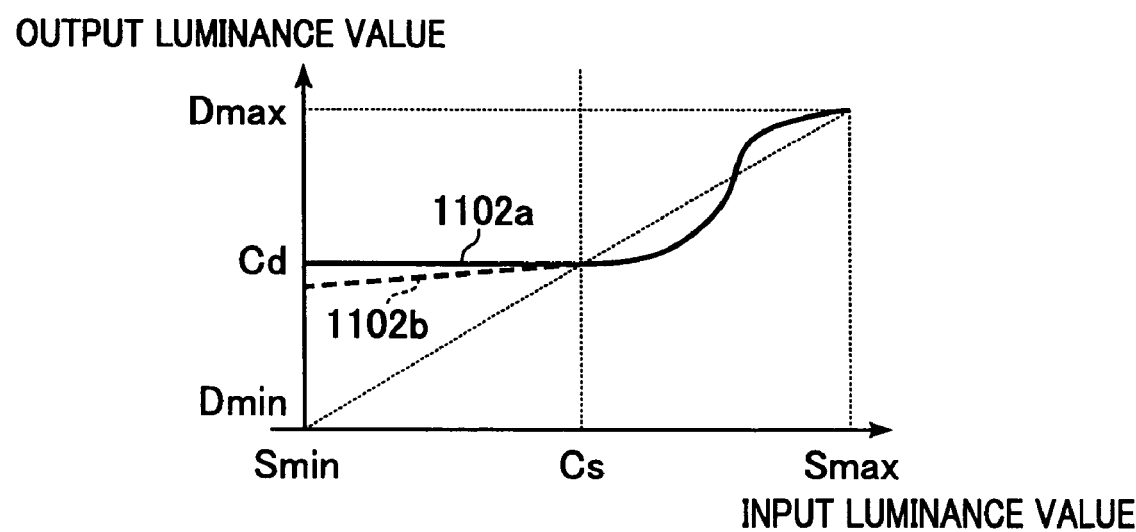

Also, FIG. 11B illustrates the properties in the case that the display mode is for displaying only disappearances in the shadows. As indicated by the property 1102*a*, the gradient of input at the reference level Cs or higher is non-linearly converted, while the gradient of input below the reference level Cs is converted to the intermediate value Cd. Thus, output is suppressed for regions with little value change in shadows in the same was as above, allowing the change in shadows to be viewed more readily.

Further, gradient conversion may be performed as indicated by the properties 1101*b* and 1102*b* (the dotted lines in FIGS. 11A and 11B). This allows the existence of regions from which a shadow has disappeared to be recognized at a low contrast in the event that the display mode is the mode for displaying the increased shadows, so the relation between the increase and disappearance can be readily understood at the same time.

While the first through third embodiments have one mode selected from the three display modes and one difference image subjected to gradient conversion, i.e., one output image, is displayed, as shown in FIG. 4, but in the event that the display region of the display unit 5 is sufficiently large, a display format may be provided for selection to allow the mode for displaying all changes in shadows and the other two modes to all be displayed.

Also, a user interface may be provided which would allow the user to change the gradient conversion properties described in the third embodiment. That is to say, the user may select a desired property from those shown in FIGS. 5A through 5C and 11A and 11B, so that the difference image will be subjected to gradient conversion according to the property selected by the user.

Fourth Embodiment

Figure 12:
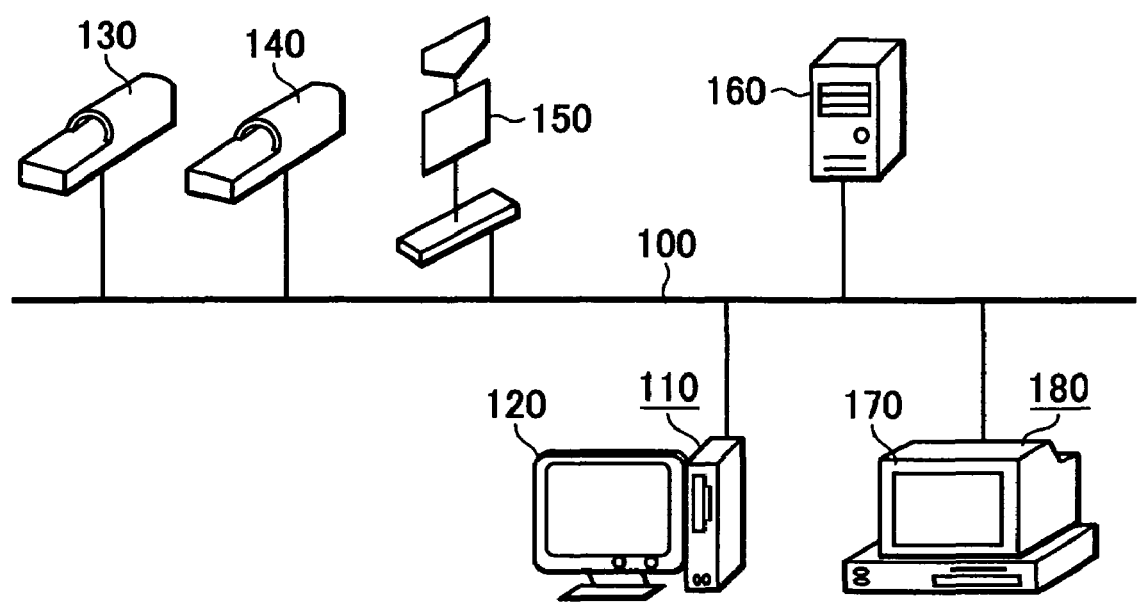
FIG. 12 is a block diagram illustrating the configuration of a medical image processing apparatus according to a fourth embodiment of the present invention.

In FIG. 12, a medical image processing apparatus 110 which is the fourth embodiment of the present invention is connected to medical image generating apparatuses 130, 140, and 150, and a medical data server 160, via a local area network (LAN) 100. The medical image generating apparatuses 130 and 140 are a CT scan apparatus and MRI apparatus for example, and the medical image generating apparatus 150 is an X-ray imaging apparatus, for example.

The medical images generated at the medical image generating apparatuses 130, 140, and 150 are directly sent to the medical image processing apparatus 110, or temporarily stored in the medical data server 160 and then sent to the medical image processing apparatus 110. The medical images sent directly to the medical image processing apparatus 110 are stored in a storage medium of the medical image processing apparatus 110.

The medical image processing apparatus 110 comprises a medical image high-definition monitor 120, which can display high-definition medical images. Also, a medical image processing apparatus 180 comprising a less expensive personal computer monitor 170 may be used.

Figure 13:
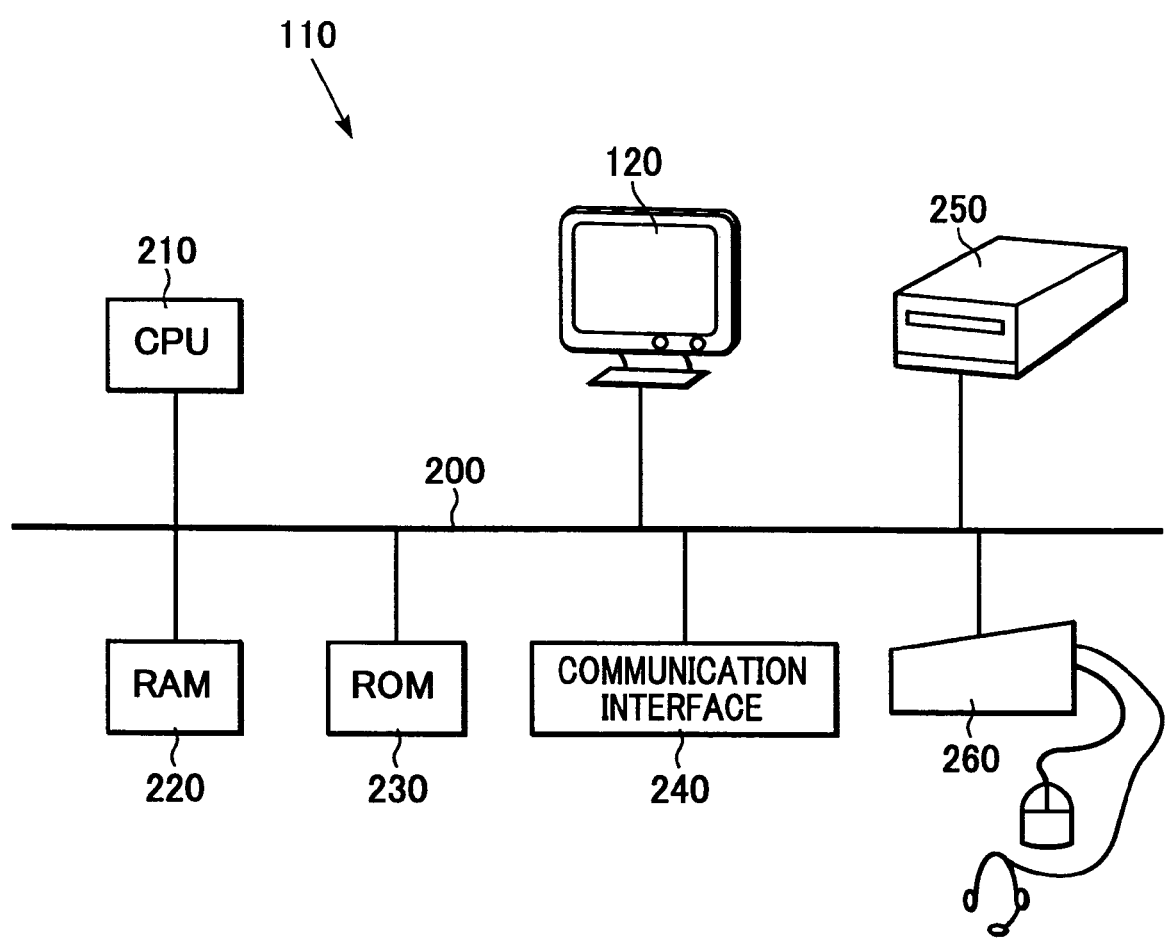
FIG. 13 is a block diagram illustrating the internal configuration of the medical image processing apparatus according to the fourth embodiment of the present invention.

In FIG. 13, the medical image processing apparatus 110 comprises a CPU 210, RAM 220, ROM 230, communication interface 240, and input means 260, connected to a bus 200, with output devices such as a medical high-definition monitor 120, a printer 250, and the like connected to the bus 200 via suitable interfaces. The input means include a keyboard, pointing device, and so forth.

The CPU 210 controls the entire medical image processing apparatus 110 and the output devices, with control programs thereof being stored in the ROM 230. The communication interface 240 controls communication over the LAN 100, so that medical images and other data are exchanged between the medical image generating apparatuses 130, 140, and 150, and the medical data server 160.

Figure 14:
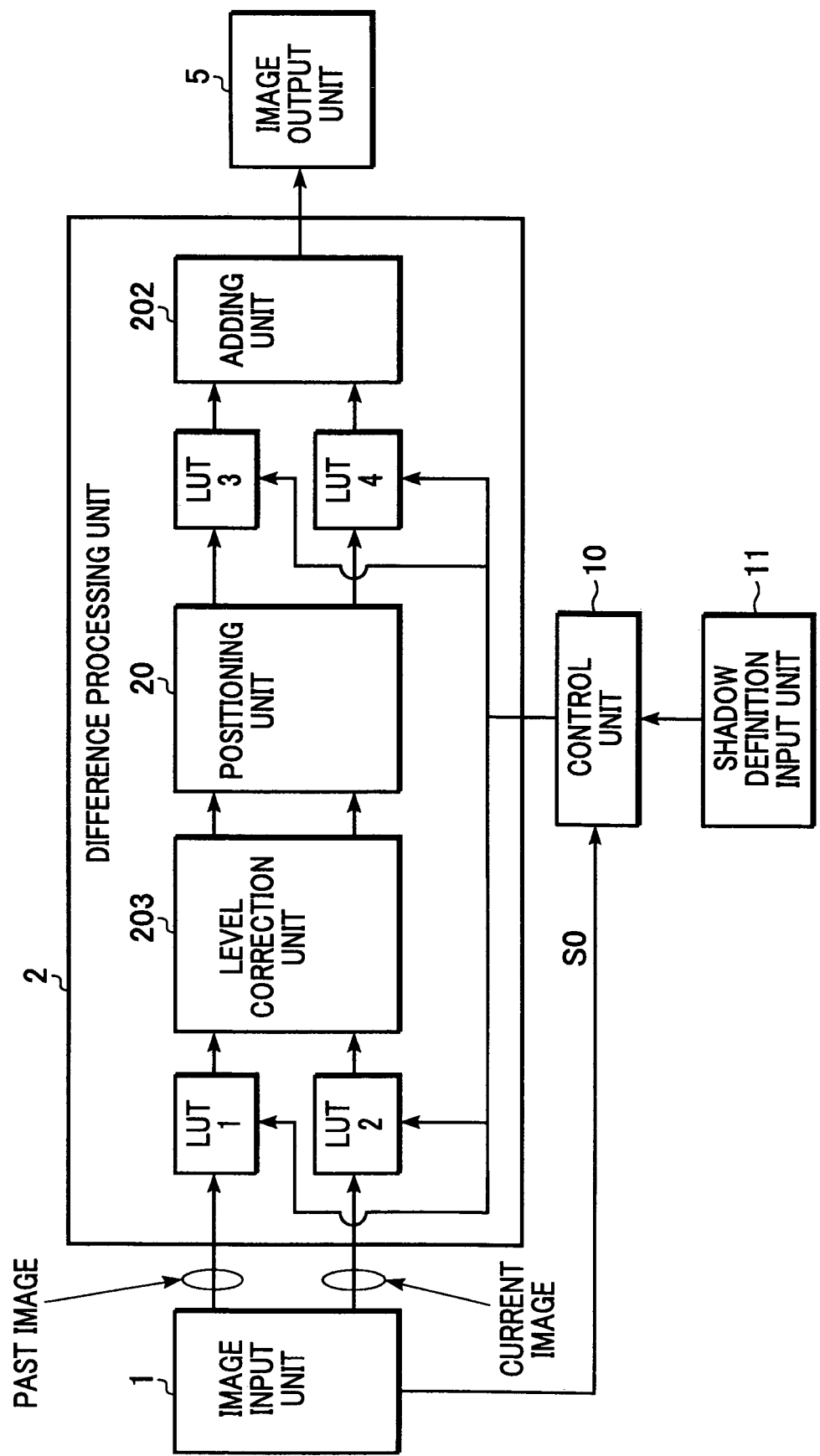
FIG. 14 is a block diagram illustrating the functional configuration of the medical image processing apparatus according to the fourth embodiment of the present invention.
Figure 15A:
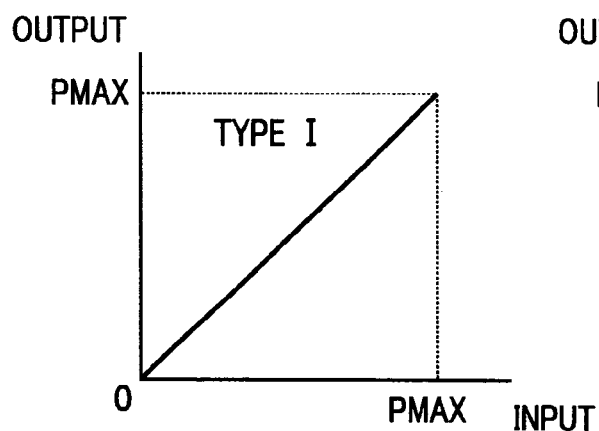
FIGS. 15A through 15C are diagrams for use in describing look-up table properties.
Figure 15B:
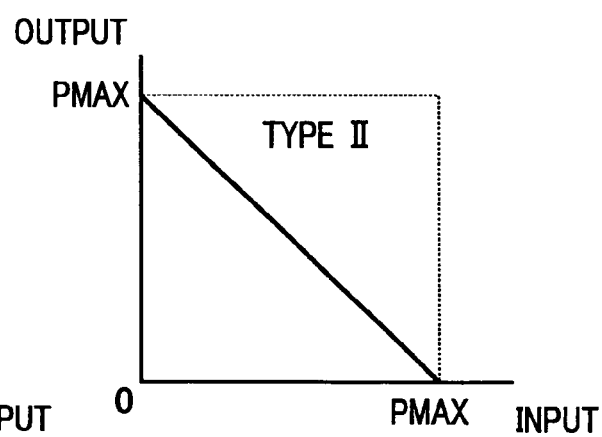
Figure 15C:
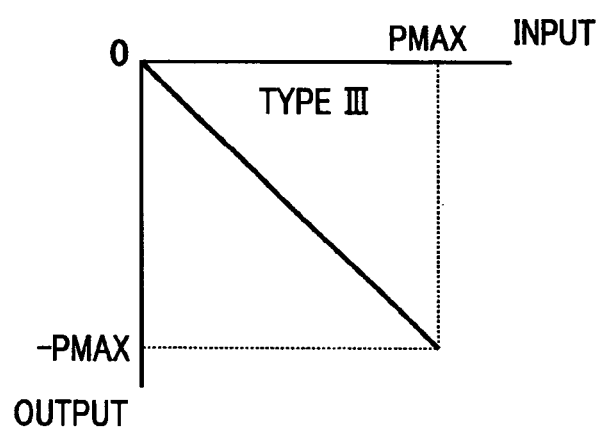

FIG. 14 is a block diagram describing the functional configuration of the medical image processing apparatus, FIGS. 15A through 15C are graphs illustrating properties of look-up tables (LUT) used with the medical image processing apparatus in FIG. 14, and FIGS. 16A and 16B are diagrams illustrating a combination of look-up tables used with the medical image processing apparatus in FIG. 14.

In FIG. 14, a file of a pair of images, made up of a current image and a past image that have been taken of the same portion of a human body at different times, is input to an image input unit 1 from the medical data server 160 via the local area network 100. Now, the image files are made up of radiogram data and tag information for keeping accessory information, including whether the image is a positive image or a negative image.

Information indicating whether the image is a positive image or a negative image is defined by an attribute value of the medical image file standard DICOM format called "Photometric Interpretation", wherein an attribute value of "MONOCHROME I" indicates a negative image and "MONOCHROME II" indicates a positive image.

The image input unit 1 outputs image data to a difference processing unit 2, and extracts the information indicating whether the past image and current image output to the difference processing unit 2 are negative images or positive images, and inputs a determination signal SO to a control unit 10.

On the other hand, correlation of the shadow on the difference image and the diagnostic judgment reference is input from a shadow definition input unit 11, from unshown external input, such as from an external storage device of a computer for example, or directly from the user. Definition of the shadow stipulates whether the parts of the affected portion increasing or decreasing are to correspond to high concentration (high luminance level) or low concentration (low luminance level) on the difference image.

FIG. 17 is a diagram illustrating an example of shadow definition, wherein Type A is defined as a region where increase of the shadow on the difference image is a low-concentration (black) area and reduction of the shadow on the difference image is a high-concentration (white) area, while Type B is defined as a region where increase of the shadow on the difference image is a high-concentration (white) area and reduction of the shadow on the difference image is a low-concentration (black) area. Now, low concentration or high concentration indicates whether a value is high or low as to a reference of the luminance level of portions with no change on the difference image.

The difference processing unit 2 has look-up tables LUT1 and LUT2 regarding the past and current images input from the image input unit 1, and necessary conversion processing is made at these look-up tables LUT1 and LUT2. The output of the look-up tables LUT1 and LUT2 is input to a level correction unit 203, the concentration of one image is shifted so that the center of the histogram of one of the images, past or current, matches the center of the histogram of the other image. Positioning images which have been subjected to level correction can improve positioning precision.

Figure 18:
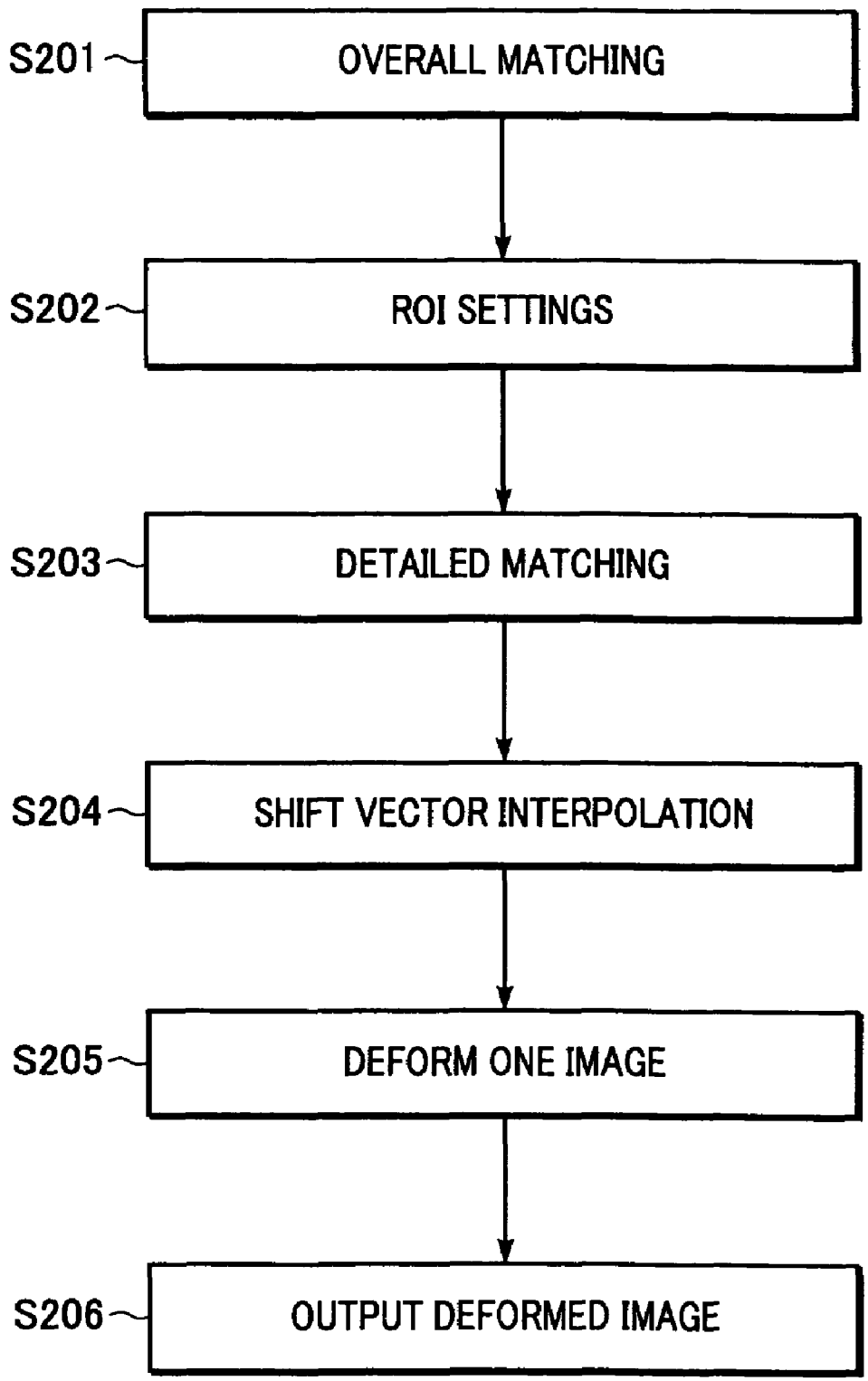
FIG. 18 is a flowchart for use in describing the actions of a positioning unit.

The output of the level correction unit 203 is input to a positioning unit 20, and subjected to coordinates conversion so that the coordinates of corresponding pixels match. The following steps shown in the flowchart in FIG. 18 are executed at the positioning unit 20 for the current and past images, so that anatomically corresponding points match.

[Step S201]

The position of the subject is detected in the current and past images, and the flow proceeds to step S202.

[Step S202]

Multiple regions of interest ROI are set at generally-corresponding positions of the current and past images, and the flow proceeds to step S203.

[Step S203]

The current and past images are matched for each ROI. For matching, cross-correlation coefficients are calculated, for example, and the position with the highest match is obtained as a shift vector.

[Step S204]

The shift vector obtained in step S203 is two-dimensionally interpolated, and parameters for coordinates conversion for matching the corresponding coordinates of the images are calculated.

[Step S205]

Either the current or past image is subjected to coordinates conversion based on the parameters obtained in step S204.

[Step S206]

The image subjected to coordinates conversion and the image not subjected to coordinates conversion are output.

Next, the output from the positioning unit 20 corresponding to the past image and the current image are each input to the look-up table LUT3 and the look-up table LUT4, and necessary conversion is performed. The output from the look-up table LUT3 and the look-up table LUT4 is input to an adding unit 202, where addition for yielding the difference is performed.

The look-up tables LUT1 through LUT4 are connected to the control unit 10, and the image input unit 1 and the shadow definition input unit 11 are connected to the control unit 10. A determination signal SO indicating whether the past and current images are negative images or positive images are input to the control unit 10 from the image input unit 1, and information indicating whether the determination method is Type A or Type B is input from the shadow definition input unit 11.

The look-up table LUT1 and the look-up table LUT2 unify both images to either negative or positive, and the look-up table LUT3 and look-up table LUT4 subject one of the images to sign inversion so that difference is performed by addition at the adding unit 202. The adding unit 202 generates a difference images, which is input to the image output unit 5.

Three types of properties can be freely selected for the look-up tables LUT1 through LUT4, as shown in FIGS. 15A through 15C. FIG. 15A shows a non-conversion look-up table (Type I) wherein the input is output without conversion, FIG. 15B shows a gradient inversion (negative/positive inversion) look-up table (Type II), and FIG. 15C shows a sign inversion look-up table (Type III).

In Table A shown in FIG. 16A, in the event that the determination method is set to Type A and the past image is a negative image and the current image is a positive image, Type I, Type II, Type I, and Type III, are set to the look-up table LUT1, look-up table LUT2, look-up table LUT3, and look-up table LUT4, respectively.

The manner in which the past and current image data changes will be described with reference to FIG. 19. First, as shown in tier (a) in FIG. 19, a lesion shadow which did not exist in the past image which is a negative image, exists in the current image which is a positive image in this example. In the event that the determination method is Type A, Type II is set to the look-up table LUT2, so the current image is subjected to gradient inversion, and average value correction is performed, so as to arrive at the state shown in the tier (b) in FIG. 19.

Figure 19:
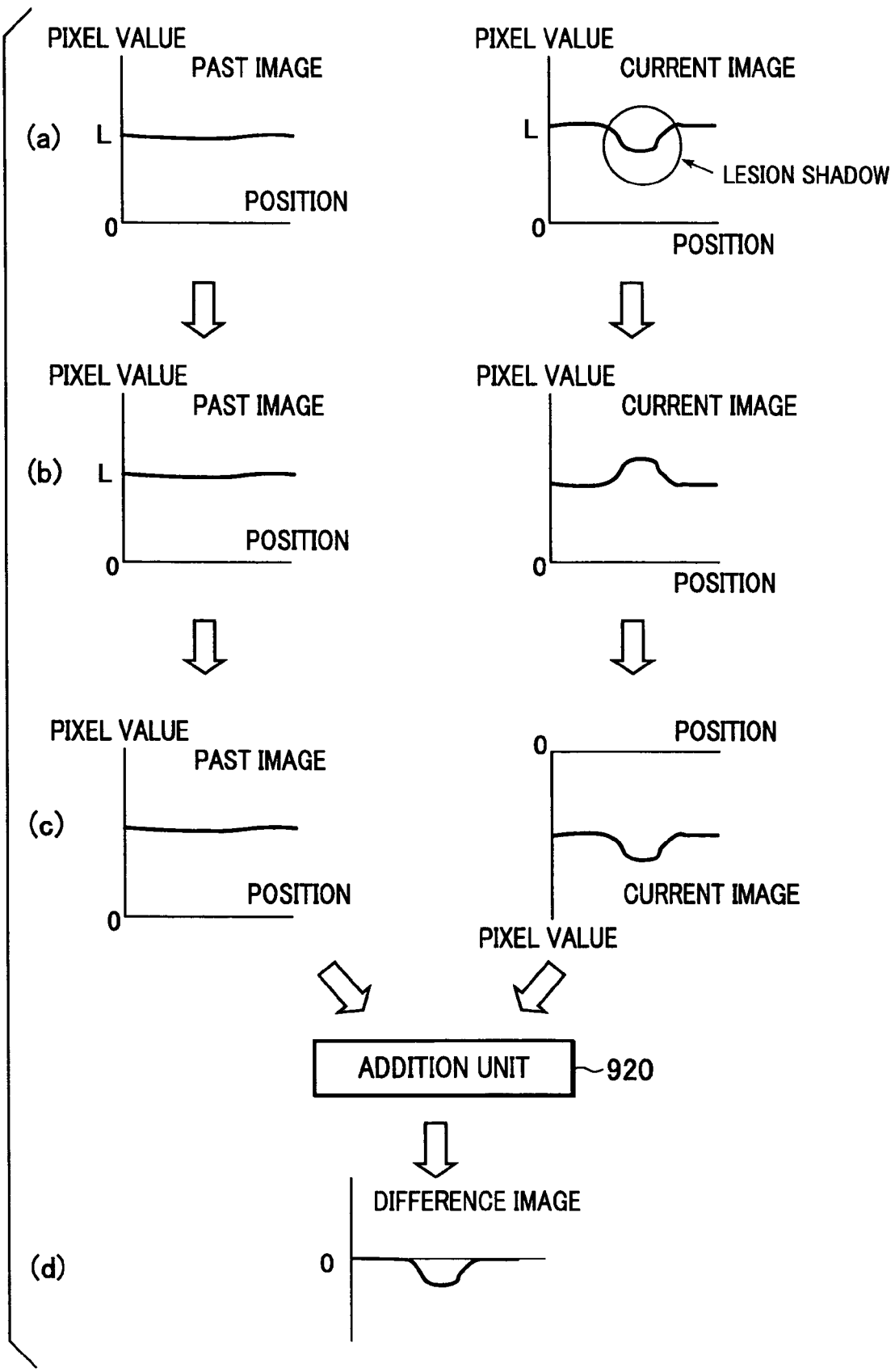
FIG. 19 is an explanatory diagram of the change in profiles of image signals.

In the event that addition is to be performed following positioning, sign inversion is performed on the current image in the look-up table LUT4, whereby the data profile of the current image arrives at the state shown in the tier (c) in FIG. 19, so difference is calculated from addition.

That is, the current image which has been subjected to gradient inversion from a positive image to a negative image is subtracted from the past image which is a negative image, so in the event that the shadow has increased, this appears as a low-concentration (black) region on the difference image, and in the event that the shadow has decreased, this appears as a high-concentration (white) region on the difference image.

In the event that the determination method is set to Type A, and the past image and current image are negative images, Type I, Type I, Type I, and Type III, are set to the look-up table LUT1, look-up table LUT2, look-up table LUT3, and look-up table LUT4, respectively. Accordingly, neither the current image or the past image is subjected to gradient inversion at the look-up table LUT1 and look-up table LUT2, and sign inversion of image signals is performed for the current image at the look-up table LUT3 and the look-up table LUT4, so the negative current image is essentially subtracted from the negative past image at the adding unit 202, whereby in the event that the shadow has increased, this appears as a low-concentration (black) region on the difference image, and in the event that the shadow has decreased, this appears as a high-concentration (white) region on the difference image.

In the event that the determination method is set to Type A, and the past image is a positive image and the current image is a negative image, Type II, Type I, Type I, and Type III, are set to the look-up table LUT1, look-up table LUT2, look-up table LUT3, and look-up table LUT4, respectively. Accordingly, following the past image being subjected to gradient inversion from a positive image to a negative image, the current image is subtracted. Accordingly, in the event that the shadow has increased, this appears as a low-concentration (black) region on the difference image, and in the event that the shadow has decreased, this appears as a high-concentration (white) region on the difference image.

In the event that the determination method is set to Type A, and the past image and current image are positive images, Type I, Type I, Type III, and Type I, are set to the look-up table LUT1, look-up table LUT2, look-up table LUT3, and look-up table LUT4, respectively. Accordingly, the past image which is a positive image is subtracted from the current image which is a positive image, so in the event that the shadow has increased, this appears as a low-concentration (black) region on the difference image, and in the event that the shadow has decreased, this appears as a high-concentration (white) region on the difference image.

In the event that both the past image and current image are negative images, subtracting the current image from the past image forms a difference image, and in the event that both the past image and current image are positive images, subtracting the past image from the current image forms a difference image, so in either case, in the event that the shadow has increased, this appears as a low-concentration (black) region on the difference image, and in the event that the shadow has decreased, this appears as a high-concentration (white) region on the difference image.

In the event that the determination method is set to Type B, and the past image and current image are negative images, Type I, Type I, Type III, and Type I, are set to the look-up table LUT1, look-up table LUT2, look-up table LUT3, and look-up table LUT4, respectively, in Table B of FIG. 16B. Accordingly, the negative past image is subtracted from the negative current image, whereby in the event that the shadow has increased, this appears as a high-concentration (white) region on the difference image, and in the event that the shadow has decreased, this appears as a low-concentration (black) region on the difference image.

In the event that the determination method is set to Type B, and the past image is a positive image and the current image is a negative image, Type I, Type II, Type I, and Type III, are set to the look-up table LUT1, look-up table LUT2, look-up table LUT3, and look-up table LUT4, respectively. Accordingly, the current image is subjected to gradient inversion from a negative image to a positive image which is subtracted from the positive past image, so in the event that the shadow has increased, this appears as a high-concentration (white) region on the difference image, and in the event that the shadow has decreased, this appears as a low-concentration (black) region on the difference image.

In the event that the determination method is set to Type B, and the past image is a negative image and the current image is a positive image, Type II, Type I, Type I, and Type III, are set to the look-up table LUT1, look-up table LUT2, look-up table LUT3, and look-up table LUT4, respectively. Accordingly, the past image is subjected to gradient inversion from a negative image to a positive image, from which the current image is subtracted, so in the event that the shadow has increased, this appears as a high-concentration (white) region on the difference image, and in the event that the shadow has decreased, this appears as a low-concentration (black) region on the difference image.

In the event that the determination method is set to Type B, and the past image and current image are positive images, Type I, Type I, Type I, and Type III, are set to the look-up table LUT1, look-up table LUT2, look-up table LUT3, and look-up table LUT4, respectively. Accordingly, the current image which is a positive image is subtracted from the past image which is a positive image, so in the event that the shadow has increased, this appears as a high-concentration (white) region on the difference image, and in the event that the shadow has decreased, this appears as a low-concentration (black) region on the difference image. In the event that both the past image and current image are negative images, subtracting the past image from the current image forms a difference image, and in the event that both the past image and current image are positive images, subtracting the current image from the past image forms a difference image, so in either case, in the event that the shadow has increased, this appears as a high-concentration (white) region on the difference image, and in the event that the shadow has decreased, this appears as a low-concentration (black) region on the difference image.

As described above, according to the present invention, increase and reduction of shadows can be expressed with a single predetermined format, regardless of the combination of attributes of the current and the past images.

Fifth Embodiment

With a display device capable of displaying DICOM format images, image data wherein the value of "Photometric Interpretation" is "MONOCHROME I" is displayed with the gradient inverted, and image data wherein the value of "Photometric Interpretation" is "MONOCHROME II" is displayed without the gradient inverted.

With the medical image processing apparatus described in the fourth embodiment, the order of subtraction was changed by changing the image to which image signal sign inversion is performed in the event that both the past image and the current image have the same image properties, but with the present embodiment, the order of subtraction is fixed, and the same results are obtained by changing the value of Photometric Interpretation provided with regard to the difference image.

Figure 20:
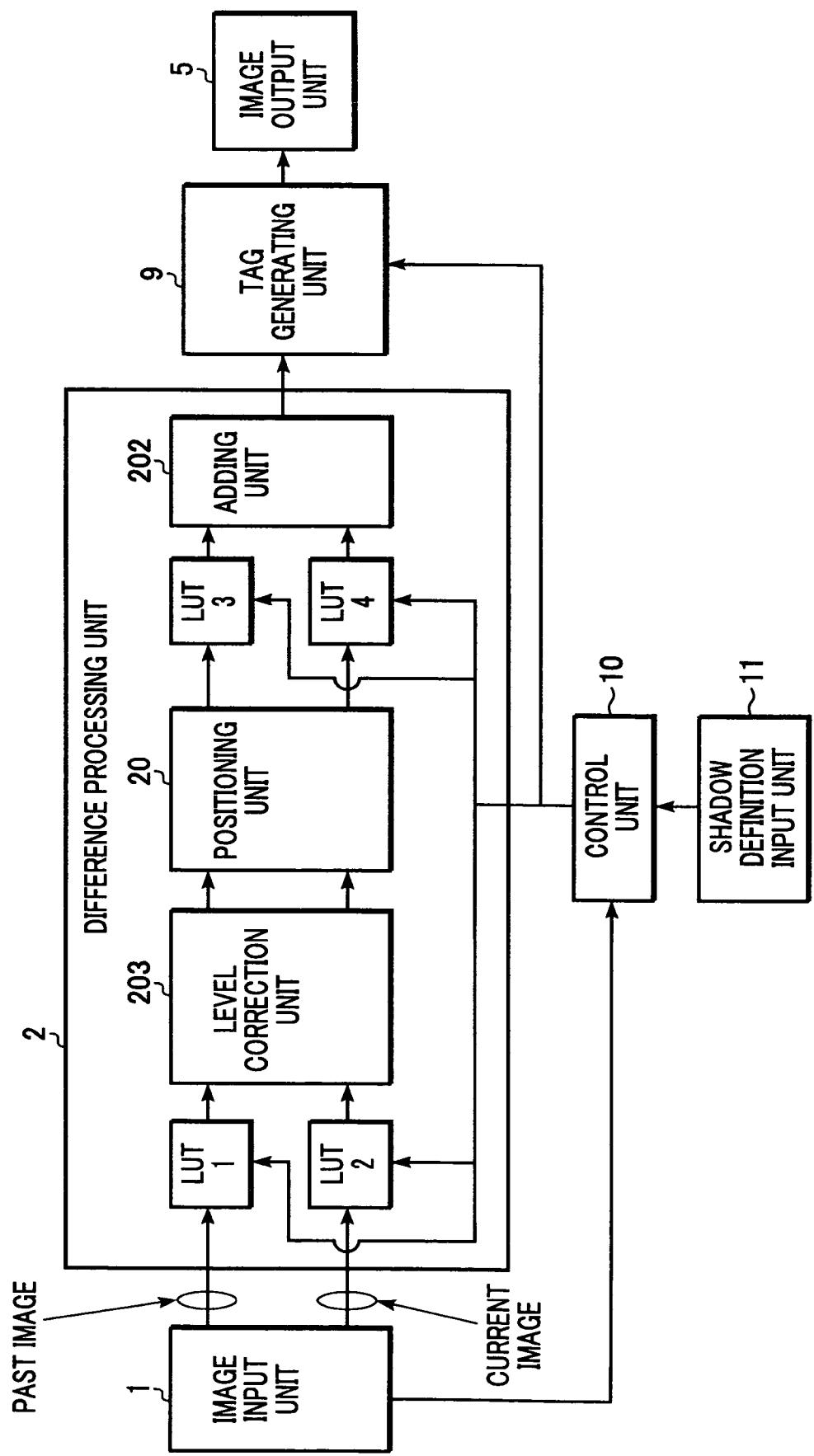
FIG. 20 is a block diagram illustrating the functional configuration of a medical image processing apparatus according to a fifth embodiment of the present invention.
Figure 22A:
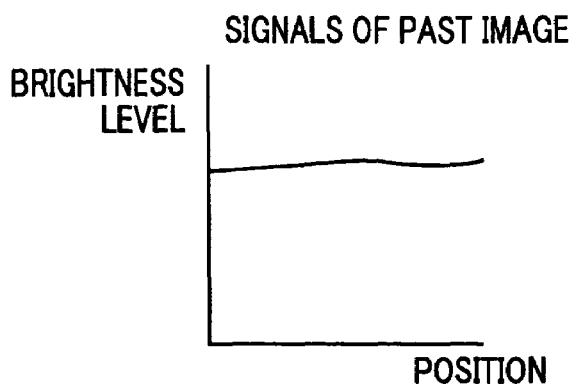
FIGS. 22A through 22D are diagrams describing an example of change in images signals for images taken of the same portion at different points in time.
Figure 22B:
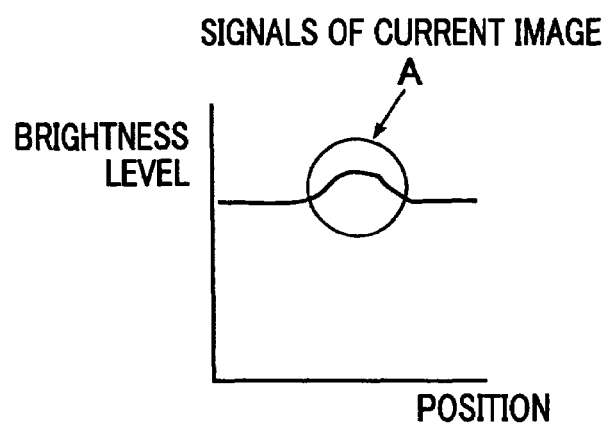
Figure 22C:
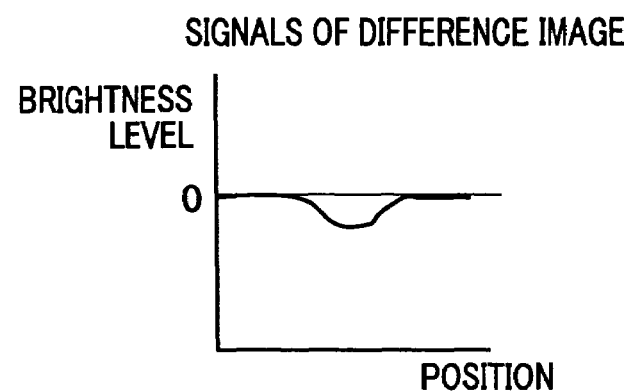
Figure 22D:
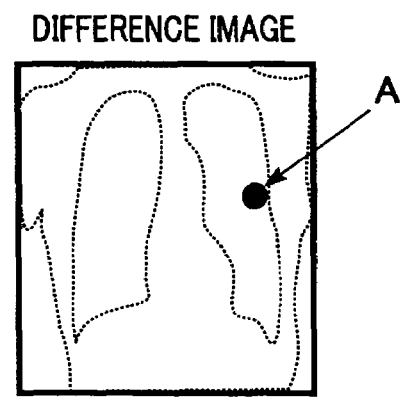

FIG. 20 is a block diagram describing the functional configuration of a medical image processing apparatus according to a fifth embodiment of the present invention. The configuration of the medical image processing apparatus is the same as that shown in FIGS. 12 and 13, so description of the configuration as such will be omitted. In FIG. 18, the parts which are the same as with the fourth embodiment will be denoted with the same reference numerals, and description thereof will be omitted. The look-up table LUT3 and the look-up table LUT4 contained in the difference processing unit 2 are not changed in property by the control unit 10, i.e., these are set so as to be unchanged.

The tag generating unit 9 generates accessory information to be attached to the difference image data output from the difference processing unit 2. This accessory information includes tag information indicating whether the difference image output from the difference processing unit 2 is a negative image or a positive image. The tag generating unit 9 generates the accessory information to be attached to the difference image data output from the difference processing unit 2 based on the combination of the accessory information of the past image data and the accessory information of the current image data input from the image input unit 1, and the shadow definition input to the shadow definition input unit 11. Accordingly, the difference image to be output from the difference processing unit 2 is output to the image output unit 5 as an image file to which accessory information generated by the tag generating unit 9 has been attached.

Now, the fifth embodiment will be described with an example wherein the look-up table LUT3 is fixed to Type I and the look-up table LUT4 is fixed to Type III.

In the event that the determination method is set to Type A, and the past image and current image are negative images, the look-up table LUT1 is set to Type I and the look-up table LUT2 is set to Type I by the control unit 10. Accordingly, neither the current image nor the past image is subjected to gradient inversion at the look-up table LUT1 and look-up table LUT2. Sign inversion of image signals is performed for the current image at the look-up table LUT3 which is fixed to Type I and the look-up table LUT4 which is fixed to Type III, so the negative current image is essentially subtracted from the negative past image at the adding unit 202. The control unit 10 controls the tag generating unit 9 so as to provide "MONOCHROME II" to the value of Photometric Interpretation for this difference image. Accordingly, when displaying this difference image on a display device capable of displaying DICOM images, in the event that the shadow has increased, this appears as a low-concentration (black) region on the difference image, and in the event that the shadow has decreased, this appears as a high-concentration (white) region on the difference image.

In the event that the determination method is set to Type A, and the past image is a negative image and the current image is a positive image, the look-up table LUT1 and the look-up table LUT2 are set to Type I and Type II, respectively. Type II is set to the look-up table LUT2, so the current image is subjected to gradient inversion. Sign inversion of image signals is performed for the current image at the look-up table LUT3 which is fixed to Type I and the look-up table LUT4 which is fixed to Type III, so the negative current image is essentially subtracted from the negative past image at the adding unit 202. The control unit 10 controls the tag generating unit 9 so as to provide "MONOCHROME II" to the value of Photometric Interpretation for this difference image. Accordingly, when displaying this difference image on a display device capable of displaying DICOM images, in the event that the shadow has increased, this appears as a low-concentration (black) region on the difference image, and in the event that the shadow has decreased, this appears as a high-concentration (white) region on the difference image.

In the event that the determination method is set to Type A, and the past image is a positive image and the current image is negative positive image, the look-up table LUT1 and the look-up table LUT2 are set to Type II and Type I, respectively. Type II is set to the look-up table LUT1, so the past image is subjected to gradient inversion. Sign inversion of image signals is performed for the current image at the look-up table LUT3 which is fixed to Type I and the look-up table LUT4 which is fixed to Type III, so the negative current image is essentially subtracted from the negative past image at the adding unit 202. The control unit 10 controls the tag generating unit 9 so as to provide "MONOCHROME II" to the value of Photometric Interpretation for this difference image. Accordingly, when displaying this difference image on a display device capable of displaying DICOM images, in the event that the shadow has increased, this appears as a low-concentration (black) region on the difference image, and in the event that the shadow has decreased, this appears as a high-concentration (white) region on the difference image.

On the other hand, in the event that the determination method is set to Type B, and the past image is a positive image and the current image is a negative image, the look-up table LUT1 and the look-up table LUT2 are set to Type I and Type II, respectively. Type II is set to the look-up table LUT2, so the current image is subjected to gradient inversion. Sign inversion of image signals is performed for the current image at the look-up table LUT3 which is fixed to Type I and the look-up table LUT4 which is fixed to Type III, so the positive current image is essentially subtracted from the positive past image at the adding unit 202. The control unit 10 controls the tag generating unit 9 so as to provide "MONOCHROME II" to the value of Photometric Interpretation for this difference image. Accordingly, when displaying this difference image on a display device capable of displaying DICOM images, in the event that the shadow has increased, this appears as a high-concentration (white) region on the difference image, and in the event that the shadow has decreased, this appears as a low-concentration (black) region on the difference image.

In the event that the determination method is set to Type B, and the past image is a negative image and the current image is positive image, the look-up table LUT1 and the look-up table LUT2 are set to Type II and Type I, respectively. Sign inversion of image signals is performed for the current image at the look-up table LUT3 which is fixed to Type I and the look-up table LUT4 which is fixed to Type III, so the positive current image is subtracted from the past image which has been subjected to gradient inversion from a negative image to a positive image. The control unit 10 controls the tag generating unit 9 so as to provide "MONOCHROME II" to the value of Photometric Interpretation for this difference image. Accordingly, when displaying this difference image on a display device capable of displaying DICOM images, in the event that the shadow has increased, this appears as a high-concentration (white) region on the difference image, and in the event that the shadow has decreased, this appears as a low-concentration (black) region on the difference image.

In the same way, in the event that the determination method is set to Type B, and the past image and the current image are positive images, the look-up table LUT1 and the look-up table LUT2 are both set to Type I. Sign inversion of image signals is performed for the current image at the look-up table LUT3 which is fixed to Type I and the look-up table LUT4 which is fixed to Type III, so the positive current image is subtracted from the positive past image. The control unit 10 controls the tag generating unit 9 so as to provide "MONOCHROME II" to the value of Photometric Interpretation for this difference image. Accordingly, when displaying this difference image on a display device capable of displaying DICOM images, in the event that the shadow has increased, this appears as a high-concentration (white) region on the difference image, and in the event that the shadow has decreased, this appears as a low-concentration (black) region on the difference image.

In the event that the determination method is set to Type A, and the past image and the current image are positive images, the look-up table LUT1 and the look-up table LUT2 are both set to Type I. Sign inversion of image signals is performed for the current image at the look-up table LUT3 which is fixed to Type I and the look-up table LUT4 which is fixed to Type III, so the positive current image is essentially subtracted from the positive past image at the adding unit 202. The control unit 10 controls the tag generating unit 9 so as to provide "MONOCHROME I" to the value of Photometric Interpretation for this difference image.

Providing "MONOCHROME I" to the value of Photometric Interpretation displays a difference image subjected to gradient inversion on a display device capable of displaying DICOM images. Accordingly, when displaying this difference image on a display device capable of displaying DICOM images, in the event that the shadow has increased, this appears as a low-concentration (black) region on the difference image, and in the event that the shadow has decreased, this appears as a high-concentration (white) region on the difference image.

In the event that the determination method is set to Type B, and the past image and the current image are negative images, the look-up table LUT1 and the look-up table LUT2 are both set to Type I, so the negative current image is subtracted from the negative past image. The control unit 10 controls the tag generating unit 9 so as to provide "MONOCHROME I" to the value of Photometric Interpretation for this difference image. Accordingly, when displaying this difference image on a display device capable of displaying DICOM images, in the event that the shadow has increased, this appears as a high-concentration (white) region on the difference image, and in the event that the shadow has decreased, this appears as a low-concentration (black) region on the difference image.

With the present embodiment, a method has been described wherein the output of the positioning unit 201 is subjected to sign inversion at the fixed look-up tables LUT3 and LUT4, and the conversion results are added at the adding unit 202, but the same results can be obtained by providing a subtracting unit 205 for subtracting the current image from the past image with regard to the output of the positioning unit 201, as shown in FIG. 21 which is a modification of the present embodiment.

Thus, with the present embodiment, changing the value of the Photometric Interpretation of the DICOM format which is provided to difference images based on the shadow definition input from the shadow definition input unit 11 and the positive/negative information of the past image and current image, with the order of subtraction fixed, allows the meaning of shadows to be unified for difference images of mixed positive images and negative images.

Other Embodiments

It is to be understood that the object of the present invention can also be achieved by supplying a storage medium storing program code of software for implementing the functions of the apparatus or system according to the first through fifth embodiments to an apparatus or system so that a computer (CPU, MPU, etc.) of the apparatus or system reads and executes the program code stored in the storage medium.

In that case, the program code itself, read from the storage medium, achieves the functions of the first or second embodiment, and thus the storage medium storing the program code and the program code itself constitute the present invention.

The storage medium for providing the program code may be, for example, a ROM, a floppy (registered trademark) disk, a hard disk, an optical disk, a magneto-optical disk, a CD-ROM, a CD-R, a magnetic tape, a non-volatile memory card, etc.

Furthermore, not only by the computer reading and executing the program code, but also by the computer executing part of or the entire process utilizing an OS, etc. running on the computer based on instructions of the program code, the functions of the first or second embodiment may be achieved. The latter is also one of embodiments of the present invention.

Furthermore, the program code read from the storage medium may be written to a memory of a function extension board inserted in the computer or a function extension unit connected to the computer. The functions of the first or second embodiment may be realized by executing part of or the entire process by a CPU, etc. of the function extension board or the function extension unit based on instructions of the program code. This is also one of embodiments of the present invention.

The present invention is also applied to a program or a storage medium storing the program.

It is to be understood that the present invention may also be applied to a system including a plurality of apparatuses (e.g., radiation generating apparatuses, radiographic apparatuses, image processing apparatuses, and interface apparatuses, etc.) and to a single apparatus in which functions of these apparatuses are integrated. When the present invention is applied to a system including a plurality of apparatuses, the apparatuses communicate with one another via, for example, electrical, optical, and/or mechanical means, and/or the like.

Furthermore, the present invention may also be applied to an image diagnosis aiding system including a network (LAN and/or WAN, etc.).

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image processing method for generating a difference image from a first radiographic image and a second radiographic image, said method comprising:
   a decision step, of deciding which one of a shadow increase region or a shadow decrease region of the difference image of the first radiographic image and the second radiographic image is to be displayed as a high-concentration region or a low-concentration region;
   an image processing step, of changing the first radiographic image and/or the second radiographic image into a negative image or a positive image based on the decision in said decision step; and
   a computing step, of computing the difference image from the first radiographic image and the second radiographic image changed in said image processing step.

2. An image processing method according to claim 1, further comprising:
   an image attributes acquisition step, of acquiring image attributes of the first radiographic image and the second radiographic image,
   wherein said image processing step includes changing the first radiographic image and/or the second radiographic image into a negative image or a positive image based on the decision in said decision step and the image attributes of the first radiographic image and the second radiographic image acquired in said image attributes acquisition step.

3. An image processing method according to claim 1, wherein said image processing step includes a gradient inversion step, in which gradient inversion processing is performed on the first radiographic image and/or the second radiographic image.

4. An image processing method according to claim 1, wherein the first radiographic image and the second radiographic image are images taken of the same portion of a human body at different points in time.

5. An image processing apparatus for generating a difference image from a first radiographic image and a second radiographic image, said apparatus comprising:

decision means for deciding which one of a shadow increase region or a shadow decrease region of the difference image of the first radiographic image and the second radiographic image is to be displayed as a high-concentration region or a low-concentration region;

image processing means for changing the first radiographic image and/or the second radiographic image into a negative image or a positive image based on the decision of said decision means; and computing means for computing the difference image from the first radiographic image and the second radiographic image changed by said image processing means.

6. An image processing apparatus according to claim 5, further comprising:

image attributes acquisition means for acquiring image attributes of the first radiographic image and the second radiographic image, wherein said image processing means includes means for changing the first radiographic image and/or the second radiographic image into a negative image or a positive image based on the decision in said decision means and the image attributes of the first radiographic image and the second radiographic image acquired by said image attributes acquisition means.

7. An image processing apparatus according to claim 5, wherein said image processing means includes gradient inversion means, where gradient inversion processing is performed on the first radiographic image and/or the second radiographic image.

8. An image processing apparatus according to claim 5, wherein the first radiographic image and the second radiographic image are images taken of the same portion of a human body at different points in time.

9. A computer-readable storage medium storing a computer-executable program having program codes for causing a computer to execute an image processing method for generating a difference image from a first radiographic image and a second radiographic image, said computer-readable storage medium comprising:

a code for a decision step, of deciding which one of a shadow increase region or a shadow decrease region of the difference image of the first radiographic image and the second radiographic image is to be displayed as a high-concentration region or a low-concentration region;

a code for an image processing step, of changing the first radiographic image and/or the second radiographic image into a negative image or a positive image based on the decision in said decision step; and a code for a computing step, of computing the difference image from the first radiographic image and the second radiographic image changed in said image processing step.

* * * * *